US011233873B2

(12) United States Patent
Liu et al.

(10) Patent No.: US 11,233,873 B2
(45) Date of Patent: Jan. 25, 2022

(54) DYNAMIC WEIGHTING FOR CLOUD-BASED PROVISIONING SYSTEMS

(71) Applicant: Oracle International Corporation, Redwood Shores, CA (US)

(72) Inventors: Xiao Liu, San Francisco, CA (US); Ying Gao, San Jose, CA (US); Jeffrey Doering, Bend, OR (US); Hailun Yang, San Mateo, CA (US); Shengda Ding, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 300 days.

(21) Appl. No.: 15/840,973

(22) Filed: Dec. 13, 2017

(65) Prior Publication Data
US 2018/0332138 A1 Nov. 15, 2018

Related U.S. Application Data

(60) Provisional application No. 62/505,732, filed on May 12, 2017.

(51) Int. Cl.
*H04L 29/08* (2006.01)
*G06F 9/48* (2006.01)
*H04L 12/24* (2006.01)

(52) U.S. Cl.
CPC .......... *H04L 67/325* (2013.01); *G06F 9/4887* (2013.01); *H04L 41/5041* (2013.01); *H04L 41/5096* (2013.01)

(58) Field of Classification Search
CPC .............. H04L 67/325; H04L 41/5041; H04L 41/5096; G06F 9/4887; G06F 9/46
See application file for complete search history.

(56) References Cited

U.S. PATENT DOCUMENTS

| | | | |
|---|---|---|---|
| 6,757,897 B1* | 6/2004 | Shi ........................ | G06F 9/4843 710/240 |
| 2015/0033237 A1* | 1/2015 | Piazza ...................... | G06F 9/46 718/102 |
| 2016/0092272 A1* | 3/2016 | Karaje .................... | G06F 3/061 718/104 |
| 2016/0314020 A1* | 10/2016 | Miller .................... | G06F 9/4843 |
| 2017/0031713 A1* | 2/2017 | Campbell .............. | G06F 9/4887 |
| 2017/0161669 A1* | 6/2017 | Chen .............. | G06Q 10/063116 |

(Continued)

*Primary Examiner* — Patrice L Winder
*Assistant Examiner* — Aye M Aung
(74) *Attorney, Agent, or Firm* — Kilpatrick Townsend & Stockton LLP

(57) ABSTRACT

In certain embodiments, a Service Deployment Infrastructure (SDI) request engine is disclosed. The SDI request engine can perform tracking, management and provisioning of services subscribed to by users of a computer infrastructure system. The SDI request engine can be deployed to process large volumes of provisioning requests and deliver time critical applications for customers. The SDI request engine can translate each request into a list of tasks of various sizes based on the requirement and configuration of the request, and store each task in a queue. In certain embodiments, the SDI request engine may evaluate a dynamic weight associated with each task to prioritize the processing of tasks, which may improve the overall throughput of request processing.

20 Claims, 14 Drawing Sheets

(56) References Cited

U.S. PATENT DOCUMENTS

2019/0073458 A1* 3/2019 McEwen ............... G06F 9/5005
2019/0166554 A1* 5/2019 Chen ................. H04W 52/0216
2020/0174698 A1* 6/2020 Fang ....................... G06F 3/067

* cited by examiner

DYNAMIC WEIGHTING FOR CLOUD-BASED PROVISIONING SYSTEMS

CROSS REFERENCE TO RELATED APPLICATIONS

This application claims the priority benefit of U.S. Provisional Application No. 62/505,732, filed on May 12, 2017, the entirety of the disclosure of which is incorporated by reference herein for all purposes.

BACKGROUND

The present disclosure relates to computer systems, and more particularly to techniques for dynamically prioritizing requests to provision services in a cloud computer system.

Cloud computing is a model for enabling efficient, on-demand network access to a shared pool of configurable computer resources (e.g., networks, servers, storage, applications, and services). The services provided or accessed through the cloud (or network) are referred to as cloud services. Provisioning a cloud service can include reserving a specific set of computer resources to enable the cloud service. For example, a specific processor or an amount of memory can be reserved from a shared pool of resources such to prevent other cloud services from accessing the reserved resources.

A cloud infrastructure may include certain provisioning computer devices configured to provision cloud resources to enable cloud services. The provisioning computer devices may receive and process hundreds of provisioning requests concurrently in an application cluster. The provisioning computer devices may communicate with many infrastructure components (e.g., storage appliances, identity management servers, virtualization solutions, and so on) in order to complete a single request to provision a service. However, the provisioning computer devices may not scale well for large clusters of application servers (e.g., having many parallel servers in one cluster) because most of the underlying infrastructure components may not sustain the load of the hundreds of provisioning requests that are concurrently processed. Additionally, the provisioning computer devices generally process requests on a first-come-first-served basis, however, if requests are processed in this manner, the time and/or resources used to process a request may be inefficient.

BRIEF SUMMARY

Embodiments are disclosed of a computer system for dynamically prioritizing requests to provision a service provided by a computer infrastructure system. Specifically, techniques are disclosed for managing requests using a dynamically weighted selection protocol that prioritizes requests. These techniques, including the computer infrastructure system, may be implemented in many different computer environments, such as an enterprise computer system and a cloud computer system.

In certain embodiments, a computer infrastructure system includes a service deployment infrastructure (SDI), which is implemented by a computer system. The SDI can perform the tracking, management and provisioning for services subscribed to by customers of the computer infrastructure system. In certain embodiments, the SDI processes large volumes of provisioning requests and delivers time critical applications to customers by dynamically prioritizing incoming requests using one or more weighted selection protocols.

A provisioning request (referred to herein as a "request") may indicate an order (e.g., a subscription order) for one or more services requested by a user (e.g., customer). The SDI, or another device of a computer infrastructure system, can identify a set of one or more tasks associated with each of the services and can store information associated with each of the services and the corresponding task in a database. In some embodiments, the SDI schedules the processing tasks associated with each request. In certain embodiments, the SDI may assign various states to a service request based on assigned states of tasks associated with the service request. Upon successful execution of the tasks associated with a service request, the SDI can provision resources (e.g., memory and processing resources) for the request. For example, a first task can indicate provisioning of a first resource (e.g., a logical or physical processor) and a second task can indicate provision of a second resource (e.g., memory).

In certain embodiments, the selection protocol implemented by the SDI to prioritize provisioning requests may handle requests stored in a queue based on a weight calculated for each request. Further, the selection protocol is configured to prioritize requests by generating an initial request weight that may change according to the availability of other infrastructure components, request states, and/or historical processing data. In certain embodiments, users may be enabled to intervene in provisioning system and modify configurations. In certain embodiments, the selection protocols are defined to prioritize requests and/or tasks associated with a request that are remaining to complete a particular provisioning request.

Techniques disclosed herein can enable a variable weight that is dynamically assigned to each task of a plurality of tasks to ensure more "fair" processing of requests. The time and/or resources needed to complete each task may not be equal. Tasks can be processed within certain time windows (e.g., provisioning cycles). The techniques may include using machine-learning techniques to prioritize certain tasks that may be completed within a provisioning cycle (e.g., within a five second window). Further, weights for tasks can be incremented if they are passed over to improve chances that they are eventually processed in the next cycle and not perpetually passed over. Weights can also be assigned for business purposes (e.g., certain clients are types of requests can be prioritized).

Techniques disclosed herein can include receiving a provisioning request associated with a client. For example, the provisioning request can include a request to perform a set of tasks. Each task of the set of tasks may correspond to a cloud application. The techniques may also include storing each task of the set of tasks in a queue. The queue may store the set of tasks to be processed. The techniques may also include assigning, for each task of the set of tasks, an initial weight to the task. The initial weight may be determined using a selection protocol. The initial weight may indicate a due time for processing the task. In some examples, processing of the task may be due at the due time. The techniques may also include selecting a first subset of tasks from amongst the set of tasks stored in the queue. Each task in the first subset of tasks may be selected based on the initial weight assigned to the task. Further, each task in the first subset of tasks may be processed during a first processing cycle. The processing may cause each task in the first subset of tasks to be completed and removed from the queue. The techniques may include selecting a second subset of tasks from amongst one or more tasks remaining in the queue after the selection of the first subset of tasks. The initial weight for each task included in the second subset of tasks may be updated. The initial weight may be updated using the selection protocol. The updated initial weight may represented a new due time for processing the task. Each task in the second subset of tasks may be processed during a second processing cycle.

Some embodiments may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, machine-readable tangible storage media, modules, or a combination thereof to perform methods and operations disclosed herein.

The techniques described above and below may be implemented in a number of ways and in a number of contexts. Several example implementations and contexts are provided with reference to the following figures, as described below in more detail. However, the following implementations and contexts are but a few of many.

Advantageously, embodiments described herein may improve computer technology by enhancing the throughput in the processing of provisioning requests. For provisioning systems that are saturated, throughput can be enhanced to enable more provisioning requests to be processed within a provisioning cycle so that requesting systems (e.g., user devices that transmit a provisioning request) receive completed provisioning orders quickly and efficiently.

BRIEF DESCRIPTION OF THE DRAWINGS

Illustrative embodiments of the present invention are described in detail below with reference to the following drawing figures.

DETAILED DESCRIPTION

Figure 1A:
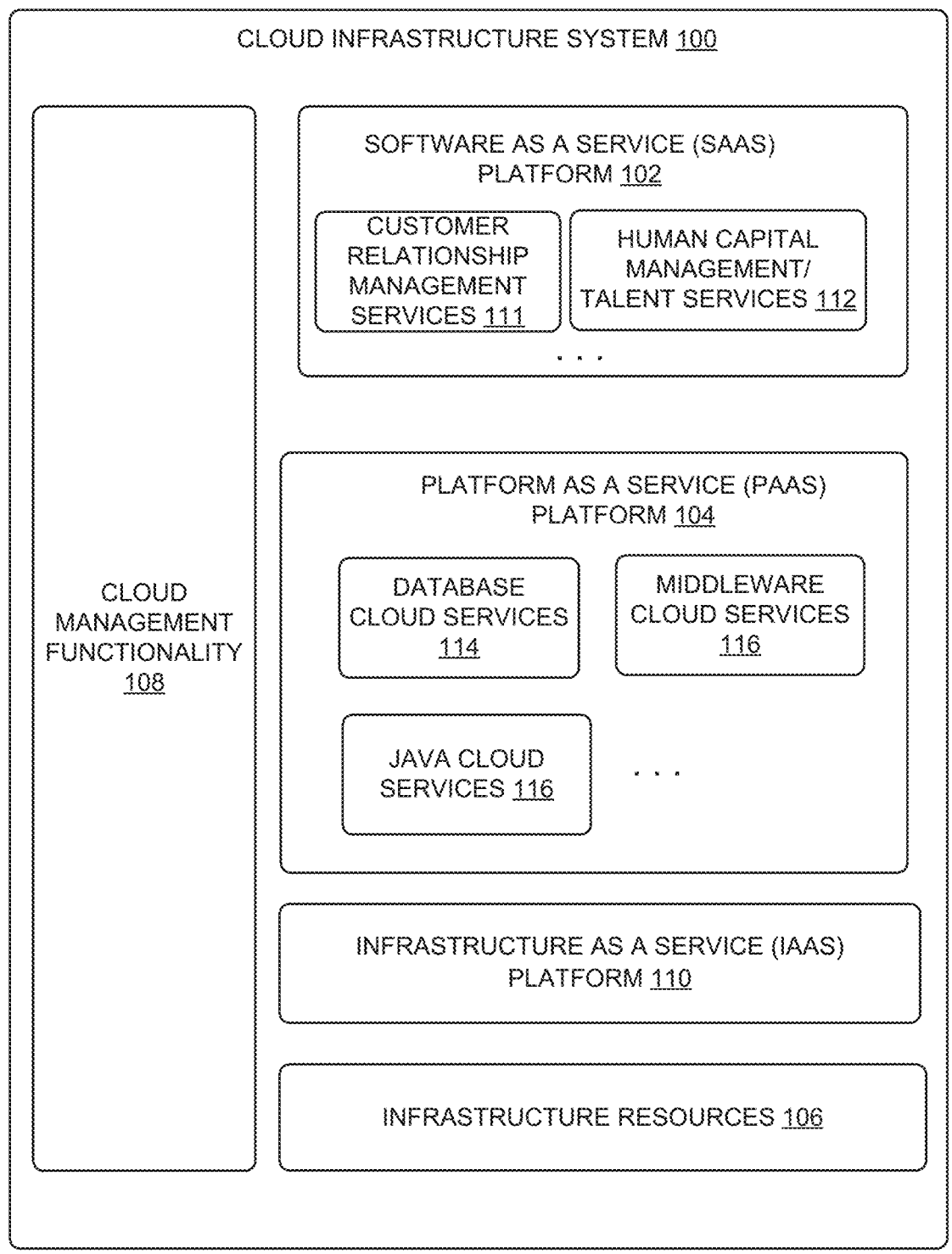
FIG. 1A is a logical view of a cloud infrastructure system according to one embodiment.

In the following description, for the purposes of explanation, specific details are set forth in order to provide a thorough understanding of embodiments of the present disclosure. However, it will be apparent that various embodiments may be practiced without these specific details. The figures and description are not intended to be restrictive.

Certain embodiments provide techniques for dynamically prioritizing requests associated with cloud applications provided by a cloud infrastructure system. An example of such a computer infrastructure system is a cloud infrastructure system such as the Oracle Public Cloud provided by the present assignee.

In certain embodiments, a computer infrastructure system may include a suite of applications, middleware and database service offerings that are delivered to a customer in a self-service, subscription-based, elastically scalable, reliable, highly available, and secure manner.

A computer infrastructure system may provide many capabilities including, but not limited to, dynamically prioritizing requests, provisioning, managing and tracking a customer's subscription for services and resources in the computer infrastructure system, providing predictable operating expenses to customers utilizing the services in the computer infrastructure system, providing robust identity domain separation and protection of a customer's data in the computer infrastructure system, providing customers with a transparent architecture and control of the design of the computer infrastructure system, providing customers assured data protection and compliance with data privacy standards and regulations, providing customers with an integrated development experience for building and deploying services in the computer infrastructure system and providing customers with a seamless integration between business software, middleware, database and infrastructure services in the computer infrastructure system.

In certain embodiments, services provided by the computer infrastructure system may include a host of services that are made available to users of the computer infrastructure system on demand such as online data storage and backup solutions, Web-based e-mail services, hosted office suites and document collaboration services, database processing, managed technical support services and the like. Services provided by the computer infrastructure system can dynamically scale to meet the needs of its users. A specific instantiation of a service provided by computer infrastructure system is referred to herein as a service instance. In general, any service made available to a user via a communication network such as the Internet from a cloud service provider's system is referred to as a cloud service. Typically, in a public cloud environment, servers and systems that make up the cloud service provider's system are different from the customer's own on-premises servers and systems. For example, a cloud service provider's system may host an application and a user may, via a communication network such as the Internet, on demand, order and use the application.

A service in a computer infrastructure includes protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and script-language middleware engine for private use by a networked developer. As another example, a service can include access to an email software application hosted on a cloud vendor's web site.

FIG. 1A is a logical view of a computer infrastructure system 100 according to one embodiment. The computer infrastructure system 100 may be implemented as a cloud-based infrastructure system (e.g., a cloud infrastructure system) or an enterprise-based infrastructure system (e.g., an enterprise infrastructure system). For purposes of illustration, computer infrastructure system 100 is described in this disclosure according to some embodiments as a cloud infrastructure system. Cloud infrastructure system 100 may provide a variety of services via a cloud or networked environment. These services may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 100. Cloud infrastructure system 100 then performs processing to provide the services in the customer's subscription order.

Cloud infrastructure system 100 may provide the cloud services via different deployment models. For example, services may be provided under a public cloud model where cloud infrastructure system 100 is owned by an organization selling cloud services (e.g., owned by Oracle) and the services are made available to the general public or different industry enterprises. As another example, services may be provided under a private cloud model where cloud infrastructure system 100 is operated solely for a single organization and may provide services for one or more entities within the organization. The cloud services may also be provided under a community cloud model where cloud infrastructure system 100 and the services provided by system 100 are shared by several organizations in a related community. The cloud services may also be provided under a hybrid cloud model, which is a combination of two or more different models.

As shown in FIG. 1A, cloud infrastructure system 100 may comprise multiple components, which working in conjunction, enable provision of services provided by cloud infrastructure system 100. In the embodiment illustrated in FIG. 1A, cloud infrastructure system 100 includes a SaaS platform 102, a PaaS platform 104, an IaaS platform 110, infrastructure resources 106, and cloud management functionality 108. These components may be implemented in hardware, or software, or combinations thereof.

SaaS platform 102 is configured to provide cloud services that fall under the SaaS category. For example, SaaS platform 102 may provide capabilities to build and deliver a suite of on-demand applications on an integrated development and deployment platform. SaaS platform 102 may manage and control the underlying software and infrastructure for providing the SaaS services. By utilizing the services provided by SaaS platform 102, customers can utilize applications executing on cloud infrastructure system 100. Customers can acquire the application services without the need for customers to purchase separate licenses and support.

Various different SaaS services may be provided. Examples include without limitation services that provide solutions for sales performance management, enterprise integration and business flexibility for large organizations, and the like. In one embodiment, the SaaS services may include Customer Relationship Management (CRM) services 111 (e.g., Fusion CRM services provided by the Oracle cloud), Human Capital Management (HCM)/Talent Management services 112, and the like. CRM services 111 may include services directed to reporting and management of a sales activity cycle to a customer, and others. HCM/Talent services 112 may include services directed to providing global workforce lifecycle management and talent management services to a customer.

Various different PaaS services may be provided by PaaS platform 104 in a standardized, shared and elastically scalable application development and deployment platform. Examples of PaaS services may include without limitation services that enable organizations (such as Oracle) to consolidate existing applications on a shared, common architecture, as well as the ability to build new applications that leverage the shared services provided by the platform. PaaS platform 104 may manage and control the underlying software and infrastructure for providing the PaaS services. Customers can acquire the PaaS services provided by cloud infrastructure system 100 without the need for customers to purchase separate licenses and support. Examples of PaaS services include without limitation Oracle Java Cloud Service (JCS), Oracle Database Cloud Service (DBCS), and others.

By utilizing the services provided by PaaS platform 104, customers can utilize programming languages and tools supported by cloud infrastructure system 100 and also control the deployed services. In some embodiments, PaaS services provided by the cloud infrastructure system 100 may include database cloud services 114, middleware cloud services (e.g., Oracle Fusion Middleware services) 116 and Java cloud services 117. In one embodiment, database cloud services 114 may support shared service deployment models that enable organizations to pool database resources and offer customers a database-as-a-service in the form of a database cloud, middleware cloud services 116 provides a platform for customers to develop and deploy various business applications and Java cloud services 117 provides a platform for customers to deploy Java applications, in the cloud infrastructure system 100. The components in SaaS platform 102 and PaaS platform 104 illustrated in FIG. 1A are meant for illustrative purposes only and are not intended to limit the scope of embodiments of the present disclosure. In alternate embodiments, SaaS platform 102 and PaaS platform 104 may include additional components for providing additional services to the customers of cloud infrastructure system 100.

Various different IaaS services may be provided by IaaS platform 110. The IaaS services facilitate the management and control of the underlying computer resources such as storage, networks, and other fundamental computer resources for customers utilizing services provided by the SaaS platform and the PaaS platform.

In certain embodiments, cloud infrastructure system 100 includes infrastructure resources 106 for providing the resources used to provide various services to customers of the cloud infrastructure system 100. In one embodiment, infrastructure resources 106 includes pre-integrated and optimized combinations of hardware such as servers, storage and networking resources to execute the services provided by the PaaS platform and the SaaS platform.

In certain embodiments, cloud management functionality 108 provides comprehensive management of cloud services (e.g., SaaS, PaaS, IaaS services) in the cloud infrastructure system 100. In one embodiment, cloud management functionality 108 includes capabilities for provisioning, managing and tracking a customer's subscription received by the cloud infrastructure system 100, and the like.

Figure 1B:
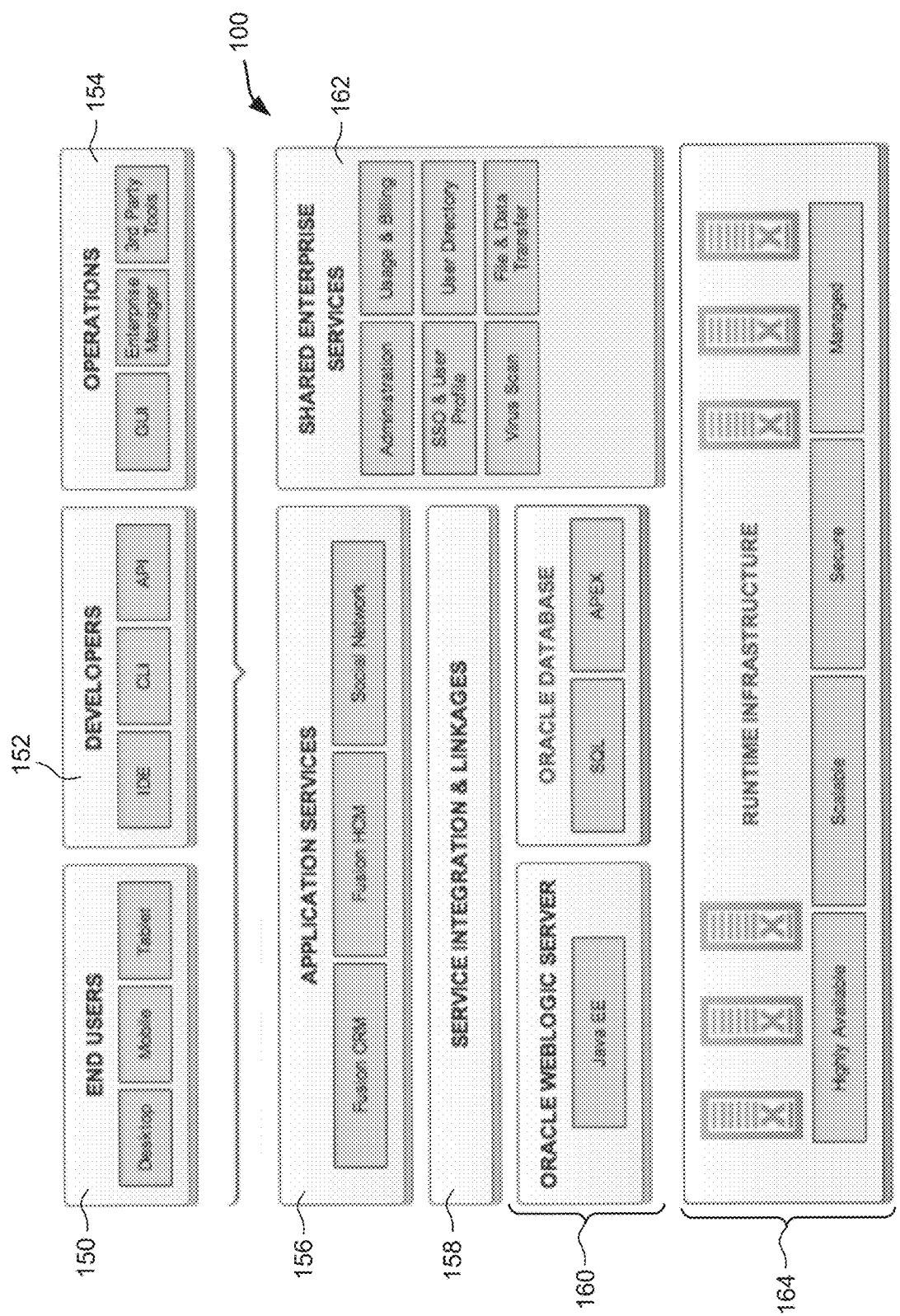
FIG. 1B is a simplified module diagram of a hardware/software stack that may be used to implement a cloud infrastructure system according to an embodiment.

FIG. 1B is a simplified module diagram of a hardware/software stack that may be used to implement cloud infrastructure system 100 according to an embodiment of the present disclosure. It should be appreciated that implementation depicted in FIG. 1B may have other components than those depicted in FIG. 1B. Further, the embodiment shown in FIG. 1B is only one example of a cloud infrastructure system that may incorporate an embodiment of the present disclosure. In some other embodiments, cloud infrastructure system 100 may have more or fewer components than shown in FIG. 1B, may combine two or more components, or may have a different configuration or arrangement of components. In certain embodiments, the hardware and software components are stacked so as to provide vertical integration that provides optimal performance.

Various types of users may interact with cloud infrastructure system 100. These users may include, for example, end users 150 that can interact with cloud infrastructure system 100 using various client devices such as desktops, mobile devices, tablets, and the like. The users may also include developers/programmers 152 who may interact with cloud infrastructure system 100 using command line interfaces (CLIs), application programming interfaces (APIs), through various integrated development environments (IDEs), and via other applications. User may also include operations personnel 154. These may include personnel of the cloud service provider or personnel of other users.

Application services layer 156 identifies various cloud services that may be offered by cloud infrastructure system 100. These services may be mapped to or associated with respective software components 160 (e.g., Oracle WebLogic server for providing Java services, oracle database for providing database services, and the like) via a service integration and linkages layer 158.

In certain embodiments, a number of internal services 162 may be provided that are shared by different components or modules of cloud infrastructure system 100 and by the services provided by cloud infrastructure system 100. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 164 represents the hardware layer on which the various other layers and components are built. In certain embodiments, runtime infrastructure layer 164 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software engineered solution that delivers high-performance, highly available, scalable, secure, and a managed platform for providing cloud services.

In some embodiments, the cloud services described above may be offered as services via a cloud environment.

Figure 2:
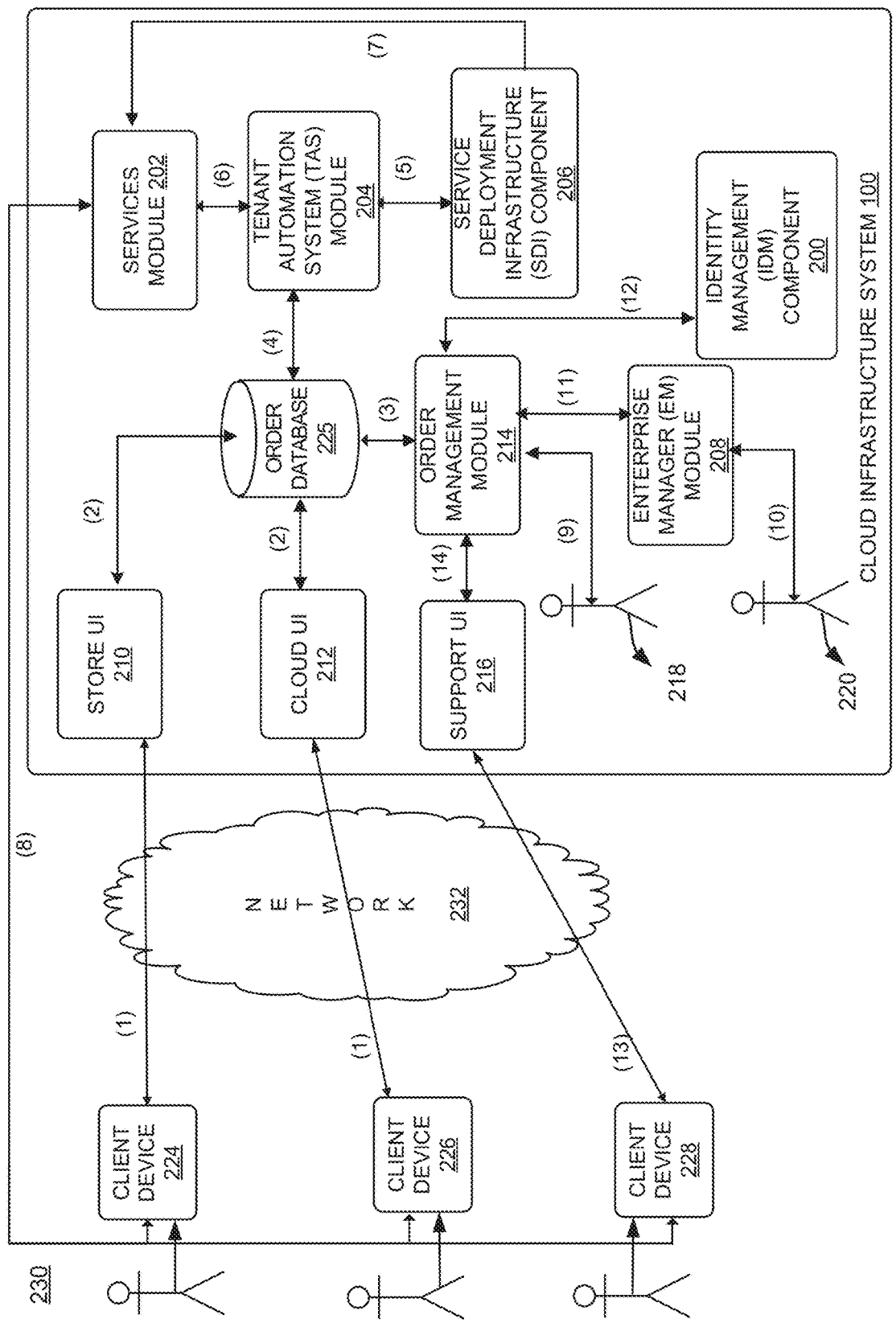
FIG. 2 is a simplified block diagram of a system environment for implementing the cloud infrastructure system shown in FIG. 1A.

FIG. 2 is a simplified block diagram of a system environment for implementing the cloud infrastructure system shown in FIG. 1A according to an embodiment of the present disclosure. In the illustrated embodiment, system environment 230 includes one or more client computer devices 224, 226 and 228 that may be used by users to interact with cloud infrastructure system 100. A client device may be configured to operate a client application such as a web browser, a proprietary client application (e.g., Oracle Forms), or some other application, which may be used by a user of the client device to interact with cloud infrastructure system 100 to utilize services provided by cloud infrastructure system 100.

It should be appreciated that cloud infrastructure system 100 depicted in FIG. 2 may have other components than those depicted in FIG. 2. Further, the embodiment shown in FIG. 2 is only one example of a cloud infrastructure system that may incorporate an embodiment of the present disclosure. In some other embodiments, cloud infrastructure system 100 may have more or fewer components than shown in FIG. 2, may combine two or more components, or may have a different configuration or arrangement of components.

Client computer devices 224, 226 and 228 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), workstation computers running any of a variety of commercially-available UNIX or UNIX-like operating systems (including without limitation the variety of GNU/Linux operating systems), or any other computer device. For example, client computer devices 224, 226 and 228 may be any other electronic device, such as a thin-client computer, Internet-enabled gaming system, and/or personal messaging device, capable of communicating over a network (e.g., network 232 described below). Although exemplary system environment 230 is shown with three client computer devices, any number of client computer devices may be supported. Other devices such as devices with sensors, etc. may interact with cloud infrastructure system 100.

A network 232 may facilitate communications and exchange of data between clients 224, 226 and 228 and cloud infrastructure system 100. Network 232 may be any type of network familiar to those skilled in the art that can support data communications using any of a variety of commercially-available protocols, including without limitation TCP/IP, SNA, IPX, AppleTalk, and the like. Merely by way of example, network 232 can be a local area network (LAN) such as an Ethernet network, a Token-Ring network and/or the like, a wide-area network, a virtual network, including without limitation a virtual private network (VPN), the Internet, an intranet, an extranet, a public switched telephone network (PSTN), an infra-red network, a wireless network (e.g., a network operating under any of the IEEE 802.1X suite of protocols, the Bluetooth protocol known in the art, and/or any other wireless protocol), and/or any combination of these and/or other networks.

Cloud infrastructure system 100 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computer devices that make up cloud infrastructure system 100 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In various embodiments, cloud infrastructure system 100 may be adapted to automatically provision, manage and track a customer's subscription to services offered by cloud infrastructure system 100. In one embodiment, as depicted in FIG. 2, the components in cloud infrastructure system 100 include an Identity Management (IDM) module 200, a services module 202, a Tenant Automation System (TAS) module 204, a Service Deployment Infrastructure (SDI) module 206, an Enterprise Manager (EM) module 208, one or more front-end web interfaces such as a store user interface (UI) 210, a cloud user interface (UI) 212, and a support user interface (UI) 216, an order management module 214, sales personnel 218, operator personnel 220 and an order database 225. These modules may include or be provided using one or more computers and/or servers which may be general purpose computers, specialized server computers, server farms, server clusters, or any other appropriate arrangement and/or combination. In one embodiment, one or more of these modules can be provided by cloud management functionality 108 or IaaS platform 110 in cloud infrastructure system 100. The various modules of the cloud infrastructure system 100 depicted in FIG. 2 are meant for illustrative purposes only and are not intended to limit the scope of embodiments of the present disclosure. Alternative embodiments may include more or fewer modules than those shown in FIG. 2.

In an exemplary operation, at (1) a customer using a client device such as client device 224 or 226 may interact with cloud infrastructure system 100 by browsing the various services provided by cloud infrastructure system 100 and placing an order for a subscription for one or more services offered by cloud infrastructure system 100. In certain embodiments, the customer may access store UI 210 or cloud UI 212 and place a subscription order via these user interfaces.

The order information received by cloud infrastructure system 100 in response to the customer placing an order may include information identifying the customer and one or more services offered by the cloud infrastructure system 100 that the customer intends to subscribe to. A single order may include orders for multiple services. For instance, a customer may login to cloud UI 212 and request a subscription for a CRM service and a Java cloud service in the same order.

Additionally, the order may also include one or more service levels for the ordered services. As used herein, and as will be discussed in greater detail below, a service level for a service determines the amount of resources to be allocated for providing the requested service in the context of the subscription, such as the amount of storage, amount of computer resources, data transfer facilities, and the like. For example, a basic service level may provide a minimum level of storage, data transmission, or number of users, and higher service levels may include additional resources.

In addition, in some instances, the order information received by cloud infrastructure system 100 may include information indicative of a customer level, and the time period during which the service is desired. The customer level specifies the priority of the customer making the subscription request. In one example, the priority may be determined based on the quality of service that the cloud infrastructure system 100 guarantees or promises the customer as specified by a Service Level Agreement (SLA) agreed to between the customer and the provider of the cloud services. In one example, the different customer levels include a basic level, a silver level and a gold level. The time period for a service may specify the start date and time for the service and the time period for which the service is desired (e.g., a service end date and time may be specified).

In one embodiment, a customer may request a new subscription via store UI 210 or request for a trial subscription via cloud UI 212. In certain embodiments, store UI 210 may represent the service provider's eCommerce store front (e.g., www.oracle.com/store for Oracle Cloud services). Cloud UI 212 may represent a business interface for the service provider. Consumer can explore available services and sign up for interested services through cloud UI 212. Cloud UI 212 captures user input necessary for ordering trial subscriptions provided by cloud infrastructure system 100. Cloud UI 212 may also be used to view account features and configure the runtime environment located within cloud infrastructure system 100. In addition to placing an order for a new subscription, store UI 210 may also enable the customer to perform other subscription-related tasks such as changing the service level of a subscription, extending the term of the subscription, increasing the service level of a subscription, terminating an existing subscription, and the like.

After an order has been placed per (1), at (2), the order information that is received via either store UI 210 or cloud UI 212 is stored in order database 225, which can be one of several databases operated by cloud infrastructure system 100 and utilized in conjunction with other system elements. While order database 225 is shown logically as a single database in FIG. 2, in actual implementation, this may comprise one or more databases.

At (3), the order is forwarded to order management module 214. Order management module 214 is configured to perform billing and accounting operations related to the order such as verifying the order and upon verification, and booking the order. In certain embodiments, order management module 214 may include a contract management module and an install base module. The contract management module may store contract information associated with the customer's subscription order such as the customer's service level agreement (SLA) with cloud infrastructure system 100. The install base module may include detailed descriptions of the services in the customer's subscription order. In addition to order information, the install base module may track installation details related to the services, product status and support service history related to the services. As a customer orders new services or upgrades existing ones, the install base module may automatically add new order information.

At (4), information regarding the order is communicated to TAS system 204. In one embodiment, TAS system 204 utilizes the order information to orchestrate the provisioning of services and resources for the order placed by the customer. At (5), TAS system 204 orchestrates the provisioning of resources to support the subscribed services using the services of SDI instance 206. At (6) TAS system 204 provides information related to the provisioned order received from SDI instance 206 to services module 202. In some embodiments, at (7), SDI instance 206 may also use services provided by services module 202 to allocate and configure the resources needed to fulfill the customer's subscription order.

According to embodiments described herein, SDI instance 206 may execute a selection protocol that dynamically prioritizes incoming requests and their corresponding tasks. The dynamic prioritization of tasks for a cloud application can enhance (e.g., increase or improve) the throughput of requests being processed by SDI instance 206. Further, the prioritization of tasks can be implemented by a selection protocol that selects tasks based on a calculated "due time" for the task. The due time for the task indicates how soon the task should be completed. In certain implementations, tasks that are associated with a request that is near completion are prioritized for processing so that the request can be completed. Further, in certain implementations, the tasks that are stored in a queue, but not selected for processing during a particular processing cycle (e.g., a five second cycle), are prioritized to avoid an excessive delay in processing tasks that are not initially selected by SDI instance 206 for processing during a given processing cycle.

At (8), services module 202 sends a notification to the customers on client devices 224, 226 and 228 regarding the status of the order.

In certain embodiments, TAS system 204 operations as an orchestration component that manages business processes associated with each order and applies business logic to determine whether an order should proceed to provisioning. In one embodiment, upon receiving an order for a new subscription, TAS system 204 sends a request to SDI instance 206 to allocate resources and configure those resources needed to fulfill the subscription order. SDI instance 206 enables the allocation of resources for the services ordered by the customer. SDI instance 206 provides a level of abstraction between the cloud services provided by cloud infrastructure system 100 and the physical implementation layer that is used to provision the resources for providing the requested services. TAS system 204 may thus be isolated from implementation details such as whether or not services and resources are actually provisioned on the fly or pre-provisioned and only allocated/assigned upon request.

In certain embodiments, a user may use store UI 210 to directly interact with order management module 214 to perform billing and accounting related operations such as verifying the order and upon verification, booking the order. In some embodiments, instead of a customer placing an order, at (9), the order may instead be placed by sales personnel 218 on behalf of the customer such as a customer's service representative or sales representative. Sales personnel 218 may directly interact with order management module 214 via a user interface (not shown in FIG. 2) provided by order management module 214 for placing orders or for providing quotes for the customer. This, for example, may be done for large customers where the order may be placed by the customer's sales representative through order management module 214. The sales representative may set up the subscription on behalf of the customer.

EM module 208 is configured to monitor activities related to managing and tracking a customer's subscription in cloud infrastructure system 100. EM module 208 collects usage statistics for the services in the subscription order such as the amount of storage used, the amount data transferred, the number of users, and the amount of system up time and system down time. At (10), a host operator personnel 220, who may be an employee of a provider of cloud infrastructure system 100, may interact with EM module 208 via an enterprise manager user interface (not shown in FIG. 2) to manage systems and resources on which services are provisioned within cloud infrastructure system 100.

Identity management (IDM) module 200 is configured to provide identity services such as access management and authorization services in cloud infrastructure system 100. In one embodiment, IDM module 200 controls information about customers who wish to utilize the services provided by cloud infrastructure system 100. Such information can include information that authenticates the identities of such customers and information that describes which actions those customers are authorized to perform relative to various system resources (e.g., files, directories, applications, communication ports, memory segments, etc.) IDM module 200 can also include the management of descriptive information about each customer and about how and by whom that descriptive information can be accessed and modified.

In one embodiment, information managed by the identity management module 200 can be partitioned to create separate identity domains. Information belonging to a particular identity domain can be isolated from all other identity domains. Also, an identity domain can be shared by multiple separate tenants. Each such tenant can be a customer subscribing to services in the cloud infrastructure system 100. In some embodiments, a customer can have one or many identity domains, and each identity domain may be associated with one or more subscriptions, each subscription having one or many services. For example, a single customer can represent a large entity and identity domains may be created for divisions/departments within this large entity. EM module 208 and IDM module 200 may in turn interact with order management module 214 at (11) and (12) respectively to manage and track the customer's subscriptions in cloud infrastructure system 100.

In one embodiment, at (13), support services may also be provided to the customer via a support UI 216. In one embodiment, support UI 216 enables support personnel to interact with order management module 214 via a support backend system to perform support services at (14). Support personnel in the cloud infrastructure system 100 as well as customers can submit bug reports and check the status of these reports via support UI 216.

Other interfaces, not shown in FIG. 2 may also be provided by cloud infrastructure system 100. For example, an identity domain administrator may use a user interface to IDM module 200 to configure domain and user identities. In addition, customers may log into a separate interface for each service they wish to utilize. In certain embodiments, a customer who wishes to subscribe to one or more services offered by cloud infrastructure system 100 may also be assigned various roles and responsibilities. In one embodiment, the different roles and responsibilities that may be assigned for a customer may include that of a buyer, an account administrator, a service administrator, an identity domain administrator or a user who utilizes the services and resources offered by cloud infrastructure system 100. The different roles and responsibilities are described more fully in FIG. 4 below.

Figure 3A:
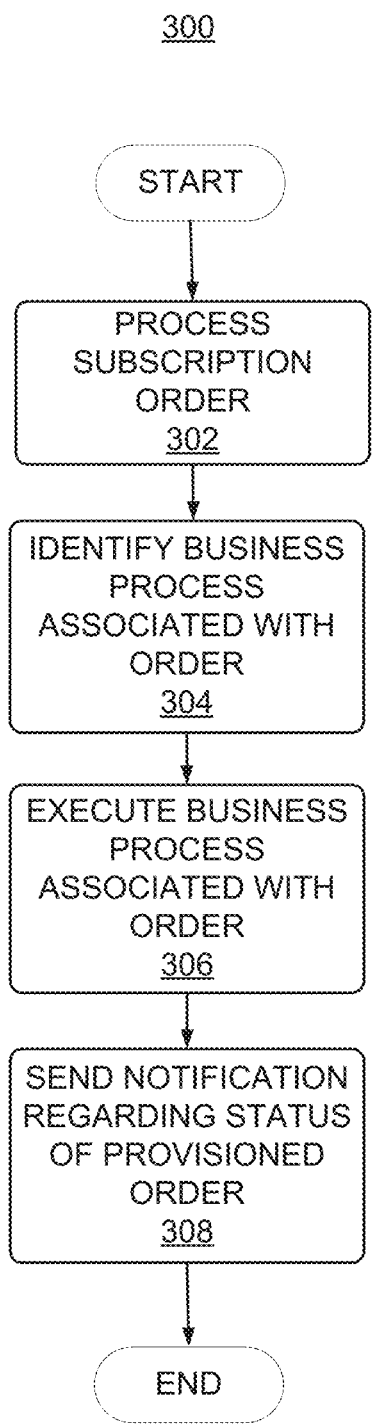
FIG. 3A illustrates a simplified flowchart 300 depicting processing that may be performed by the TAS system in the cloud infrastructure system, in accordance with an embodiment.

FIG. 3A depicts a simplified flowchart 300 depicting processing that may be performed by the TAS system in the cloud infrastructure system, in accordance with an embodiment of the present disclosure. The processing depicted in FIG. 3A may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 3A is not intended to be limiting. Other sequences of steps may also be performed according to alternative embodiments. For example, alternative embodiments of the present disclosure may perform the steps outlined above in a different order. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 3A may be performed by one or more components in TAS system 204 as will be described in detail in FIG. 3B.

At 302, a customer's subscription order is processed. The processing may include validating the order, in one example. Validating the order includes ensuring that the customer has paid for the subscription and ensuring that the customer does not already have subscriptions with the same name or that the customer is not attempting to create multiple subscriptions of the same type in the same identity domain for subscription types for which this is disallowed (such as, in the case of a CRM service). Processing may also include tracking the status of an order for each order that is being processed by cloud infrastructure system 100.

At 304, a business process associated with the order is identified. In some instances, multiple business processes may be identified for an order. Each business process identifies a series of steps for processing various aspects of the order. As an example, a first business process may identify one or more steps related to provisioning physical resources for the order, a second business process may identify one or more steps related to creating an identity domain along with customer identities for the order, a third business process may identify one or more steps for related to performing back office operations such as creating a customer record for the user, performing accounting operations related to the order, and the like. In certain embodiments, different business processes may also be identified for processing different services in an order. For example, different business process may be identified to process a CRM service and a database service.

At 306, the business process identified for the order in 304 is executed. Executing the business process associated with the order may include orchestrating the series of steps associated with the business process identified in step 304. For example, executing a business process related to provisioning physical resources for the order may include sending a request to SDI instance 206 to allocate resources and configure those resources needed to fulfill the subscription order. As described in greater detail herein, instead of processing the tasks of requests in a first-in-first-out architecture, SDI instance 206 may prioritize individual tasks based on a selection protocol. The task prioritization by SDI instance 206 may enhance the throughput of requests in the cloud infrastructure and ensure that orders are handled as soon as possible.

At 308, a notification is sent to the customer regarding the status of the provisioned order. Additional description related to performing steps 302, 304, 306 and 308 is provided in detail in FIG. 3B.

Figure 3B:
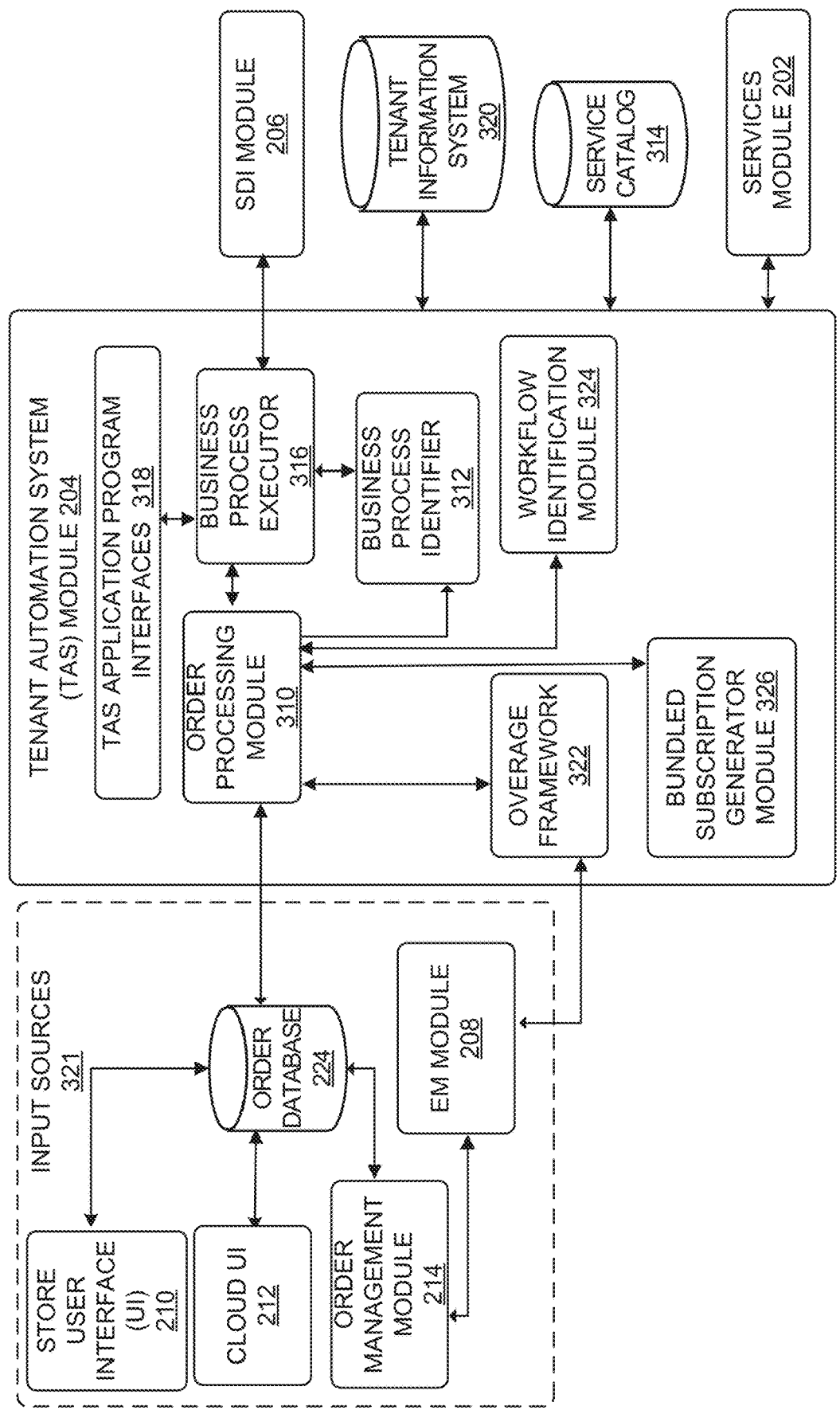
FIG. 3B illustrates a simplified high level diagram of one or more sub-modules in the TAS system in the cloud infrastructure system, in accordance with an embodiment.

FIG. 3B depicts a simplified high level diagram of one or more sub-modules in the TAS system in the cloud infrastructure system, in accordance with an embodiment of the present disclosure. In one embodiment, the modules depicted in FIG. 3B perform the processing described in steps 302-308 discussed in FIG. 3A. In the illustrated embodiment, TAS system 204 comprises an order processing module 310, a business process identifier 312, a business process executor 316, an overage framework 322, a workflow identification module 324, and a bundled subscription generator module 326. These modules may be implemented in hardware, or software, or combinations thereof. The various modules of the TAS system depicted in FIG. 3B are meant for illustrative purposes only and are not intended to limit the scope of embodiments of the present disclosure. Alternative embodiments may include more or fewer modules than those shown in FIG. 3B.

In one embodiment, order processing module 310 receives an order from a customer from one or more input sources 321. For example, order processing module 310 may directly receive an order via cloud UI 212 or store UI 210, in one embodiment. Alternatively, order processing module 310 may receive an order from order management module 214 or order database 225. Order processing module 310 then processes the order. In certain embodiments, processing the order includes generating a customer record which includes information about the order such as a service type, a service level, a customer level, the type of resources, the amount of the resources to be allocated to the service instance and a time period during which the service is desired. As part of the processing, order processing module 310 also determines whether the order is a valid order. This includes ensuring that the customer does not already have subscriptions with the same name or that the customer is not attempting to create multiple subscriptions of the same type in the same identity domain for subscription types where this is disallowed (such as, in the case of a fusion CRM service).

Order processing module 310 may also perform additional processing on the order. Processing may include tracking the status of an order for each order that is being processed by cloud infrastructure system 100. In one embodiment, order processing module 310 may process each order to identify a number of states pertaining to the order. In one example, the different states of an order may be an initialized state, a provisioned state, an active state, an administration required state, an error state, and the like. An initialized state refers to the state of a new order; a provisioned state refers to the state of an order once the services and resources for the order have been provisioned. An order is in an active state when the order has been processed by TAS system 204 and a notification to that effect has been delivered to the customer. An order is in an administration required state when intervention by an administrator is needed to resolve the issue. The order is in an error state when the order cannot be processed. In addition to maintaining the order progress status, order processing module 310 also maintains detailed information about any failures encountered during process execution. In other embodiments, and as will be discussed in detail below, the additional processing performed by order processing module 310 may also include changing the service level for a service in the subscription, changing the services included in the subscription, extending the time period of the subscription, and canceling the subscription or specifying different service levels for different time periods in the subscription.

After an order has been processed by order processing module 310, business logic is applied to determine whether the order should proceed to provisioning. In one embodiment, as part of orchestrating the order, business process identifier 312 receives the processed order from order processing module 310 and applies business logic to identify a particular business process to use for the order being processed. In one embodiment, business process identifier 312 may utilize information stored in a service catalog 314 to determine the particular business process to be used for the order. In one embodiment, and as discussed in FIG. 3A, multiple business processes may be identified for an order and each business process identifies a series of steps for processing various aspects of the order. In another embodiment, and as discussed above, different business processes may be defined for different types of services, or combinations of services such as a CRM service or a database service. In one embodiment, service catalog 314 may store information mapping an order to a particular type of business process. Business process identifier 312 may use this information to identify a specific business process for the order being processed.

Once a business process has been identified, business process identifier 312 communicates the particular business process to be executed to business process executor 316. Business process executor 316 then executes steps of the identified business process by operating in conjunction with one or more modules in the cloud infrastructure system 100. In some embodiments, business process executor 316 acts as an orchestrator for performing the steps associated with a business process. For example, the business process executor may interact with order processing module 310 to execute steps in a business process that identifies workflows related to the order, determines the overage of services in the order or identifies service components related to the order.

In one example, business process executor 316 interacts with SDI instance 206 to execute steps in a business process for allocating and provisioning resources for services requested in the subscription order. In this example, for each step in the business process, business process executor 316 may send a request to SDI instance 206 to allocate resources and configure resources needed to fulfill the particular step. SDI instance 206 is responsible for the actual allocation of the resources. Once all the steps of the business processes of an order have been executed, business process executor 316 may send a notification to the customer of the processed order by utilizing the services of services module 202. The notification may include sending an email notification to the customer with details of the processed order. The email notification may also include deployment information related to the order to enable the customer to access the subscribed services.

In certain embodiments, TAS system 204 may provide one or more TAS Application Programming Interfaces (APIs) 318 that enable TAS system 204 to interact with other modules in cloud infrastructure system 100 and for other modules to interact with TAS system 204. For example, the TAS APIs may include a system provisioning API that interacts with SDI instance 206 via an asynchronous Simple Object Access Protocol (SOAP) based web services call to provision resources for the customer's subscription order. In one embodiment, TAS system 204 may also utilize the system provisioning API to accomplish system and service instance creation and deletion, switch a service instance to an increased service level, and associate service instances. An example of this is the association of a Java service instance to a fusion applications service instance to allow secure web service communications. The TAS APIs may also include a notification API that interacts with the services module 202 to notify the customer of a processed order. In certain embodiments, the TAS system 204 also periodically propagates subscription information, outages, and notifications (e.g. planned downtime) to services module 202.

In certain embodiments, TAS system 204 periodically receives usage statistics for each of the provisioned services such as the amount of storage used, the amount data transferred, the number of users, and the amount of system up time and system down time from EM module 208. Overage framework 322 utilizes the usage statistics to determine whether over use of a service has occurred, and if so, to determine how much to bill for the overage, and provides this information to order management module 214.

In certain embodiments, TAS system 204 includes an order workflow identification module 324 that is configured to identify one or more workflows associated with processing a customer's subscription order. In certain embodiments, TAS system 204 may include a subscription order generation framework 326 for generating subscription orders for a customer when the customer places a subscription order for one or more services offered by the cloud infrastructure system 100. In one embodiment, a subscription order includes one or more service components responsible for providing the services requested by a customer in the subscription order.

Additionally, TAS system 204 may also interact with one or more additional databases such as a Tenant Information System (TIS) database 320 to enable the provisioning of resources for one or more services subscribed by the customer while taking into consideration historical information, if any, available for the customer. TIS database 320 may include historical order information and historical usage information pertaining to orders subscribed by the customer.

TAS system 204 may be deployed using different deployment models. In certain embodiments, the deployment includes a central component that interfaces with one or more distributed components. The distributed components may, for example, be deployed as various data centers and accordingly may also be referred to as data center components. The central component includes capabilities to process orders and co-ordinate services in cloud infrastructure system 100, while the data center components provide capabilities for provisioning and operating the runtime system that provides the resources for the subscribed services.

Figure 4:
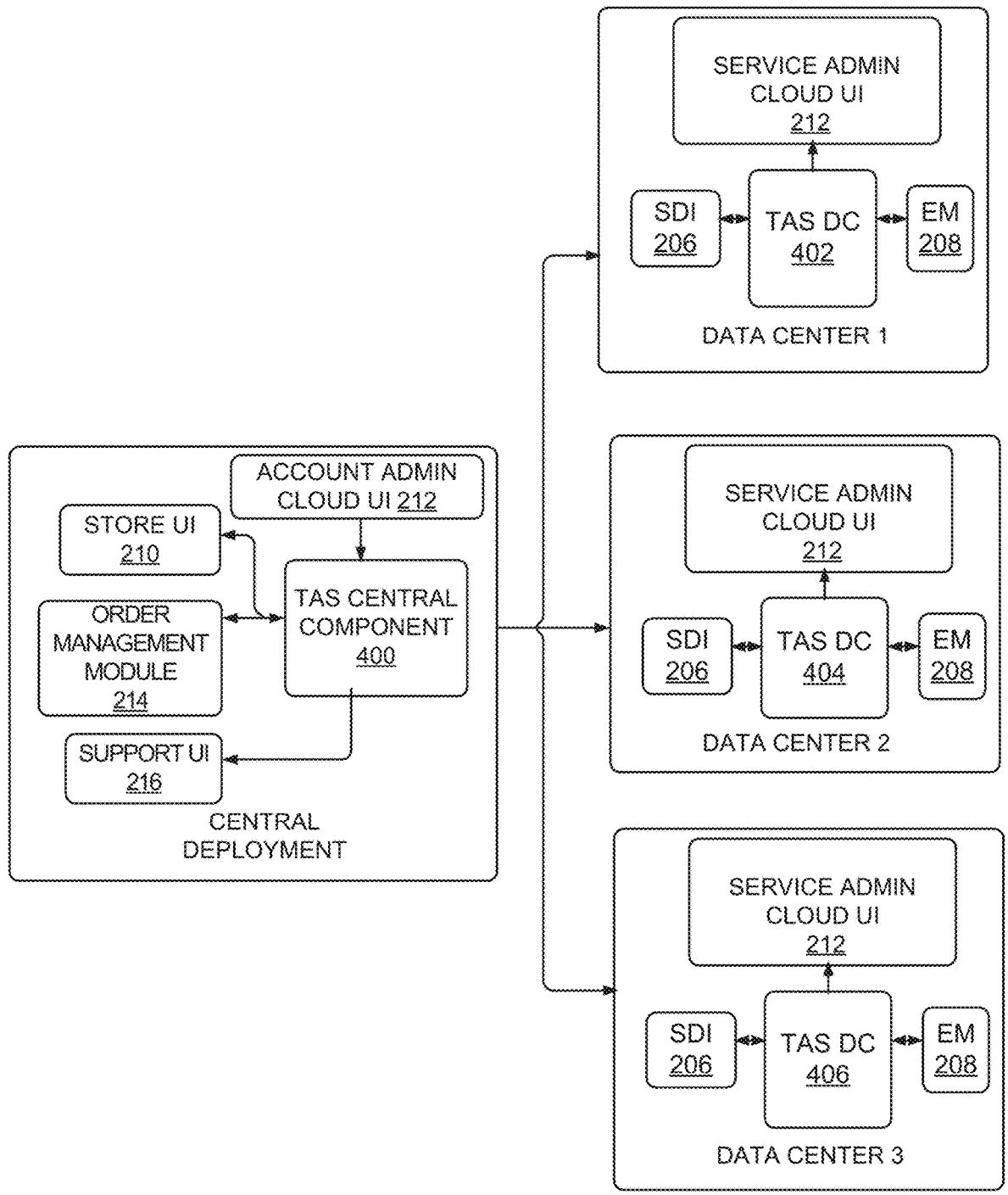
FIG. 4 illustrates an exemplary distributed deployment of the TAS component, according to an embodiment.

FIG. 4 depicts an exemplary distributed deployment of the TAS system, according to an embodiment of the present disclosure. In the embodiment depicted in FIG. 4, the distributed deployment of TAS system 204 includes a TAS central component 400 and one or more TAS Data Centers (DCs) components 402, 404 and 406. These components may be implemented in hardware, or software, or combinations thereof.

In one embodiment, the responsibilities of TAS central component 400 include, without limitation, to provide a centralized component for receiving customer orders, performing order-related business operations such as creating a new subscription, changing the service level for a service in the subscription, changing the services included in the subscription, and extending the time period of the subscription, or canceling the subscription. The responsibilities of TAS central component 400 may also include maintaining and serving subscription data needed by cloud infrastructure system 100 and interfacing with order management module 214, support UI 216, cloud UI 212 and store UI 210 to handle all the back-office interactions.

In one embodiment, the responsibilities of TAS DCs 402, 404 and 406 include, without limitation, performing runtime operations for orchestrating the provisioning the resources for one or more services subscribed by the customer. TAS DCs 402, 404 and 406 also include capabilities to perform operations such as locking, unlocking, enabling, or disabling a subscription order, collecting metrics related to the order, determining the status of the order, and sending notification events related to the order.

In an exemplary operation of the distributed TAS system shown in FIG. 4, TAS central component 400 initially receives an order from a customer via cloud UI 212, store UI 210, via order management module 214, or via order database 225. In one embodiment, the customer represents a buyer who has financial information and the authority to order and/or change a subscription. In one embodiment, the order information includes information identifying the customer, the type of services that the customer wishes to subscribe to, and an account administrator who will be responsible for handling the request. In certain embodiments, the account administrator may be nominated by the customer when the customer places an order for a subscription to one or more services offered by cloud infrastructure system 100. Based on the order information, the TAS central component 400 identifies the data region of the world such as Americas, EMEA, or Asia Pacific in which the order originates and the particular TAS DCs (for e.g., 402, 404 or 406) that will be deployed for provisioning the order. In one embodiment, the particular TAS DC (for e.g., from among DCs 402, 404 or 406) that will be deployed for provisioning the order is determined based on the geographical data region in which the request originated.

TAS central component 400 then sends the order request to the particular TAS DC in which to provision services for the order request. In one embodiment, TAS DCs 402, 404 or 406 identify a service administrator and an identity domain administrator responsible for processing the order request at the particular TAS DC. The service administrator and the identity administrator may be nominated by the account administrator identified in the subscription order. TAS DCs 402, 404 or 406 communicate with SDI instance 206 to orchestrate the provisioning of physical resources for the order. SDI instance 206 in respective TAS DCs 402, 404 or 406 allocates resources and configures those resources needed to fulfill the subscription order.

In certain embodiments, TAS DCs, 402, 404 or 406 identify an identity domain associated with the subscription. SDI instance 206 may provide the identity domain information to IDM module 200 (shown in FIG. 2) for identifying an existing identity domain or creating a new identity domain. Once the order is provisioned by the SDI instance at respective TAS DCs, 402, 404 or 406, TAS central component 400 may place information regarding the provisioned resources in a support system, via support UI 216. Information may include, for example, displaying resource metrics related to the services and usage statistics of the services.

Once in operation, at each data center, EM module 208 to periodically collects usage statistics for each of the provisioned services provisioned at that data center, such as the amount of storage used, the amount data transferred, the number of users, and the amount of system up time and system down time. These statistics are provided to the TAS DC that is local to EM module 208 (i.e., at the same data center). In an embodiment, the TAS DCs may use the usage statistics to determine whether overuse of a service has occurred, and if so, to determine how much to bill for the overage, and provide the billing information to order management module 214.

Figure 5:
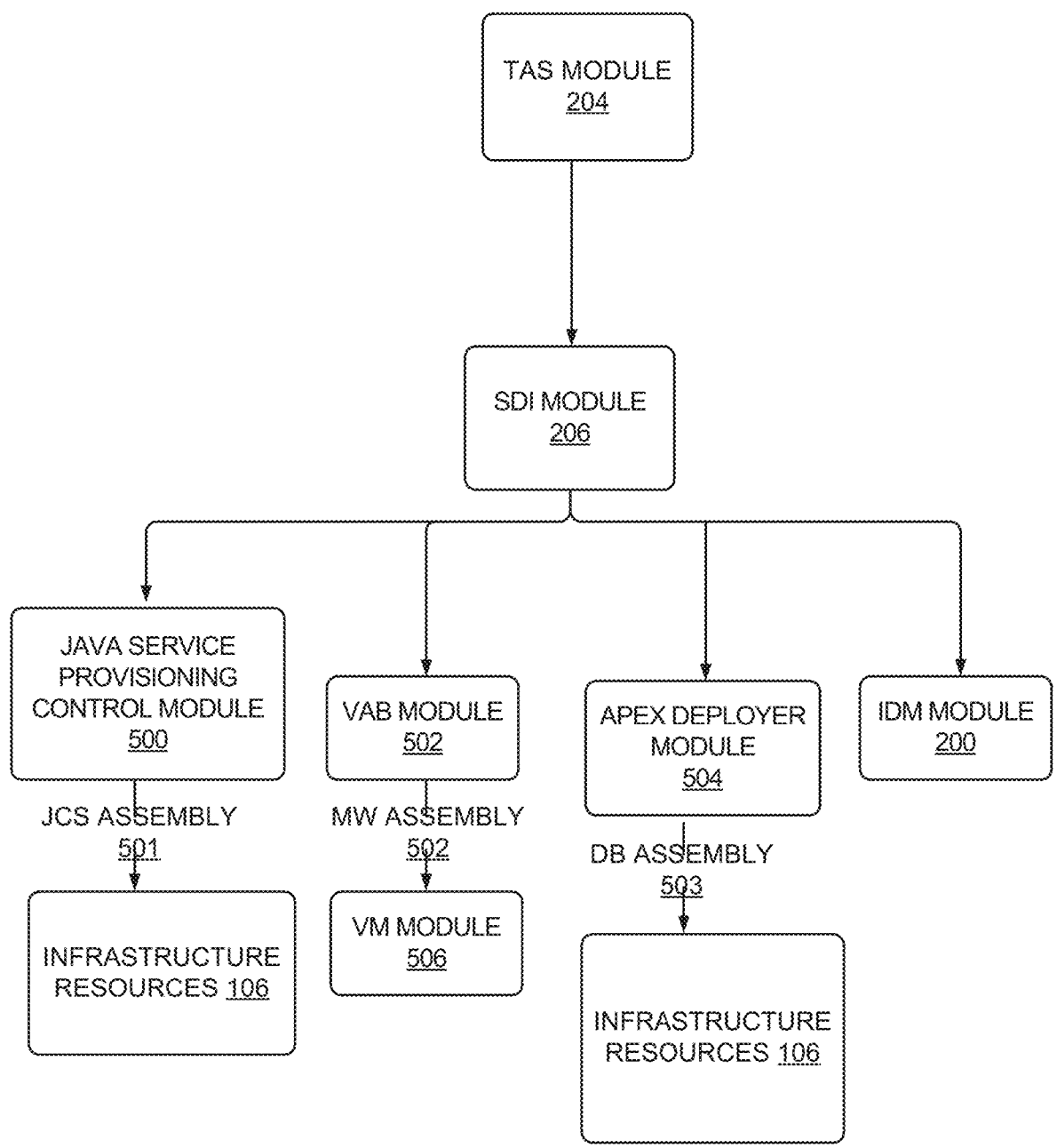
FIG. 5 is a simplified block diagram illustrating the interactions of the SDI instance with one or more modules in the cloud infrastructure system, in accordance with an embodiment.

FIG. 5 is a simplified block diagram illustrating the interactions of the SDI instance with one or more modules in the cloud infrastructure system, in accordance with an embodiment of the present disclosure. In certain embodiments, SDI instance 206 interacts with TAS system 204 to provision resources for services in a subscription order received by TAS system 204. In certain embodiments, one or more of the modules illustrated in FIG. 5 may be modules within cloud infrastructure system 100. In other embodiments, one or more of the modules that interact with SDI instance 206 may be outside cloud infrastructure system 100. In addition, alternative embodiments may have more or less modules than those shown in FIG. 5. These modules may be implemented in hardware, or software, or combinations thereof.

In one embodiment, the modules in SDI instance 206 may include one or more modules in SaaS platform 102 and PaaS platform 104 in cloud infrastructure system 100. In order to perform provisioning of resources for various services, SDI instance 206 may interact with various other modules, each customized to help with provisioning resources for a particular type of service. For example, as illustrated in FIG. 5, SDI instance 206 may interact with a Java service provisioning control module 500 to provision Java cloud services. In certain embodiments, Java service provisioning control component 500 may deploy a Java Cloud Service (JCS) assembly specified by SDI instance 206 that includes a set of tasks to be performed to provision Java cloud services. SDI instance 206 may store each task of the set of tasks in a queue, along with other tasks SDI instance 206 may individually prioritize each of the tasks of the set of tasks based on a selection protocol described in greater detail below. Infrastructure resources 106 then determines the resources needed to provision the Java cloud services.

As other examples, SDI instance 206 may interact with one or more modules such as a Virtual Assembly Builder (VAB) module 502, an Application Express (APEX) deployer module 504, a Virtual Machine (VM) module 506, an IDM module 200, and a database machine module 118. VAB module 502 includes capabilities to configure and provision complete multi-tier application environments. In one embodiment, VAB module 502 deploys a Middleware (MW) service assembly specified by SDI instance 206 to provision a MW service in cloud infrastructure system 100 using the services provided by VM module 506. APEX deployer module 504 includes capabilities to configure and provision database services. In one embodiment, APEX deployer module 504 deploys a database service assembly specified by SDI instance 206 to provision a database service in cloud infrastructure system 100 using the resources provided by infrastructure resources 106. SDI instance 206 interacts with IDM module 200 to provide identity services such as access management across multiple applications in cloud infrastructure system 100.

Figure 6:
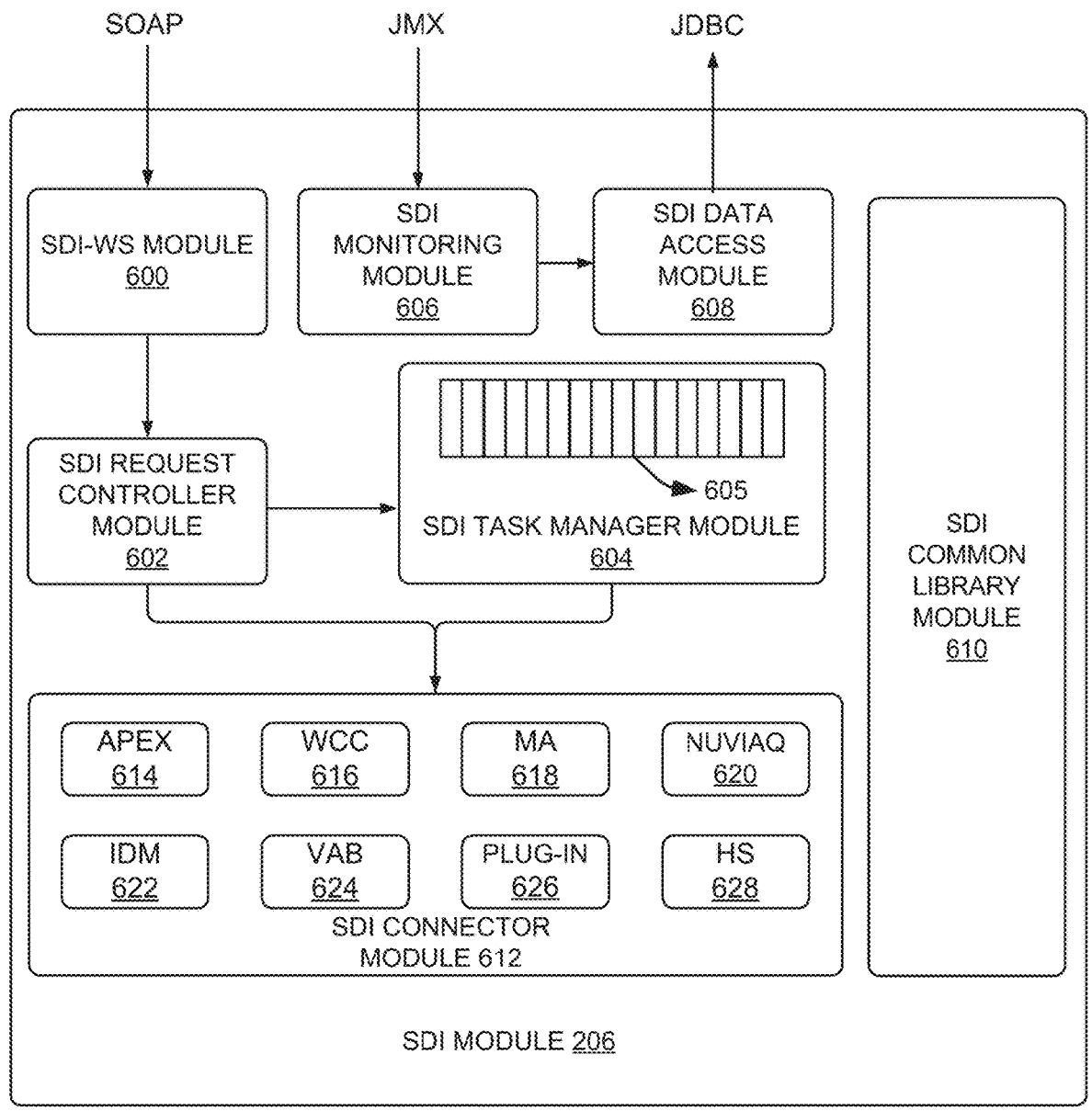
FIG. 6 illustrates a simplified high level diagram of sub-modules of the SDI instance according to an embodiment.

FIG. 6 depicts a simplified high level diagram of sub-modules of the SDI instance according to an embodiment of the present disclosure. In the embodiment depicted in FIG. 6, SDI instance 206 includes a SDI-Web Services (WS) module 600, an SDI request controller module 602, an SDI task manager module 604, an SDI monitoring module 606, an SDI data access module 608, an SDI common library module 610, and an SDI connector module 612. These modules may be implemented in hardware, or software, or combinations thereof. SDI instance 206 depicted in FIG. 6 and its various modules are meant for illustrative purposes only and are not intended to limit the scope of embodiments of the present disclosure. Alternative embodiments may have more or less modules than those shown in FIG. 6. These modules and their operations are described in detail below.

SDI-WS module 600 includes capabilities for receiving a step in the business associated with an order from business process executor 316 of TAS system 204. In one embodiment, SDI-WS module 600 parses each step of the business process and converts the step into an internal representation used by SDI instance 206. In one embodiment, each step of the business process associated with the order arrives through a web service processing layer (for example, via System Provisioning API discussed in FIG. 3B) in the form of a SOAP request to SDI-WS module 600.

SDI request controller module 602 is the internal request processing engine in SDI instance 206 and includes capabilities for performing asynchronous request processing, concurrent request processing, concurrent task processing, fault tolerant and recovery and plug-in support related to the order requests. In one embodiment, SDI request controller module 602 accepts each step of the business process associated with the order from SDI-WS module 600 and submits the step to SDI task manager module 604.

SDI task manager module 604 translates each step specified in the business process into a series of tasks for provisioning the particular step. Once the set of tasks for a specific step have been provisioned, SDI task manager module 604 responds to business process executor 316 in TAS system 204 with operation results that includes an order payload with details of the resources provisioned to fulfill the particular step. SDI task manager module 604 repeats this process until all the steps of the particular business process associated with the order are complete.

In certain embodiments, SDI task manager module 604 may be structured to include queue 605. When SDI task manager module 604 translates each step specified in the business process into the series of tasks, each task of the series of tasks may be stored in queue 605. Queue 605 may store tasks, which result after translating other steps specified in other business processes. As a non-limiting example, SDI task manager module 604 may translate step "CreateGenericServiceTask" for a "CREATE" request (e.g., a request for provisioning a service) into 44 tasks, which are used to provision a particular service. The 44 tasks may be stored in queue 605, along with other tasks for other requests.

In certain embodiments, SDI instance 206 may be associated with one or more servers that process the tasks stored in queue 605. In some cases, a server associated with SDI instance 206 may have a set number of server threads. A server thread may the smallest sequence of programmed instructions that can be managed independently by a scheduler. For example, a server with 300 server threads can concurrently process 300 tasks from queue 605. However, in some examples, queue 605 can store more than 300 tasks. SDI instance 206 can execute a selection protocol to determine a weight for each task stored in queue 605 in order to determine which tasks to select for processing. The weight for each task stored in queue 605 may be an indicator of the "due time" for the task. Continuing with the example above, SDI instance 206 may execute the selection protocol to select the 300 tasks with the shortest due time from all of the tasks stored in queue 605, so that each server thread can process one of the 300 selected tasks during a processing cycle (e.g., a five second interval). The tasks selected for processing may be a subset of the set of tasks stored in queue 605. Each task may be selected based on a weight that is calculated by the selection protocol. The weight may be an indicator of how soon the task should be completed (e.g., the due time of the task).

As a non-limiting example scenario, the tasks that are selected during a first processing cycle are processed (e.g., completed), and then removed from queue 605. The tasks that are not selected during the first processing cycle remain stored in queue 605 and are available to be selected during a second processing cycle. The selection protocol may prioritize the tasks that were not selected during the first processing cycle to improve the likelihood that the tasks that were not selected during the first processing cycle would be selected during the second processing cycle.

In certain embodiments, SDI task manager module 604 translates each step specified in the business process into a series of tasks by utilizing the services of SDI connector module 612. SDI connector module 612 includes one or more connectors for handling the deployment of tasks specified by SDI task manager module 604 to provision one or more services related to the order request. In certain embodiments, one or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, Application Express (APEX) connector 614 interfaces with APEX deployer module 504 to provision database services. Web Center Connector 616 (WCC) interfaces with a web center module in cloud infrastructure system 100 to provision web services. The web center module is a user engagement platform and includes capabilities for delivering connectivity between people and information in cloud infrastructure system 100.

In certain embodiments, Middleware Applications (MA) connector 618 interfaces with VAB module 502 in cloud infrastructure system 100 to provision middleware application services. NUVIAQ connector 620 interfaces with VAB module 502 to provision Java services. IDM connector 622 interfaces with IDM module 200 to provide identity and access management for users subscribing to services and resources in cloud infrastructure system 100. Virtual Assembly Builder (VAB) connector 624 interfaces with VAB module 502 in cloud infrastructure system 100 to configure and provision complete multi-tier application environments. Plug-in connector 626 interfaces with EM module 208 to manage and monitor the components in cloud infrastructure system 100. HTTP server connector 628 interfaces with one or more web servers in the PaaS platform to provide connection services to users in cloud infrastructure system 100.

SDI monitoring module 606 in SDI instance 206 provides an inbound interface for receiving Java Management Extensions (JMX) requests. SDI monitoring module 606 also provides tools for managing and monitoring applications, system objects and devices in cloud infrastructure system 100. SDI-data access module 608 provides an inbound interface for receiving Java Database Connectivity (JDBC)

requests. SDI-data access module 608 supports data access and provides object relational mapping, java transaction API services, data access objects, and connection pooling in cloud infrastructure system 100. The SDI-common library module 610 provides configuration support for the modules in SDI instance 206.

Figure 7:
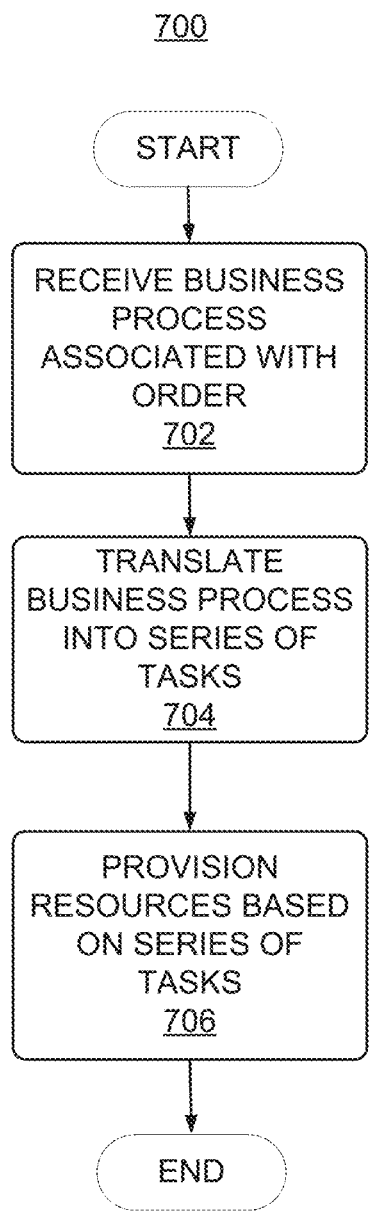
FIG. 7 illustrates a simplified flowchart depicting processing that may be performed by the SDI component in the cloud infrastructure system, in accordance with an embodiment.

The embodiment of FIG. 6 discussed above describes modules in the SDI instance according to an embodiment of the present disclosure. FIG. 7 depicts a simplified flowchart 700 depicting processing that may be performed by the modules of the SDI instance in the cloud infrastructure system, in accordance with an embodiment of the present disclosure. The processing depicted in FIG. 7 may be implemented in software (e.g., code, instructions, program) executed by one or more processors, hardware, or combinations thereof. The software may be stored in memory (e.g., on a memory device, on a non-transitory computer-readable storage medium). The particular series of processing steps depicted in FIG. 7 is not intended to be limiting. Other sequences of steps may also be performed according to alternative embodiments. For example, alternative embodiments of the present disclosure may perform the steps outlined above in a different order. Moreover, the individual steps illustrated in FIG. 7 may include multiple sub-steps that may be performed in various sequences as appropriate to the individual step. Furthermore, additional steps may be added or removed depending on the particular applications. One of ordinary skill in the art would recognize many variations, modifications, and alternatives. In one embodiment, the processing depicted in FIG. 7A may be performed by one or more modules in the SDI instance 206 discussed in detail in FIG. 6.

At 702, a business process associated with a subscription order is received. In one embodiment, SDI-WS module 600 in SDI instance 206 receives one or more steps in the business process associated with the subscription order from business process executor 316. At 704, each step in the business process is translated into a series of tasks for provisioning resources for the subscription order. In one embodiment, SDI task manager module 604 in SDI instance 206 translates each step specified in the business process into a series of tasks by utilizing the services of SDI connector module 612. At 706, the subscription order is provisioned based on the series of tasks. In one embodiment, and as discussed in FIG. 6, SDI connector module 612 includes one or more connectors for handling the deployment of tasks specified by SDI task manager module 604 to provision resources for the services in the subscription order.

As described above with respect to FIG. 6, SDI task manager module 604 translates each step specified in a business process into a series of tasks by utilizing the services of SDI connector module 612, which may include one or more connectors for handling the deployment of tasks specified by SDI task manager module 604 to provision one or more services related to the order request. One or more of the connectors may handle tasks that are specific to a particular service type while other connectors may handle tasks that are common across different service types. In one embodiment, SDI connector module 612 includes a set of connectors (wrapper APIs) that interface with one or more of the external modules (shown in FIG. 5) in cloud infrastructure system 100 to provision the services and resources related to the order request. For example, a NUVIAQ connector 620 interfaces with VAB module 502 to provision Java services.

Figure 8:
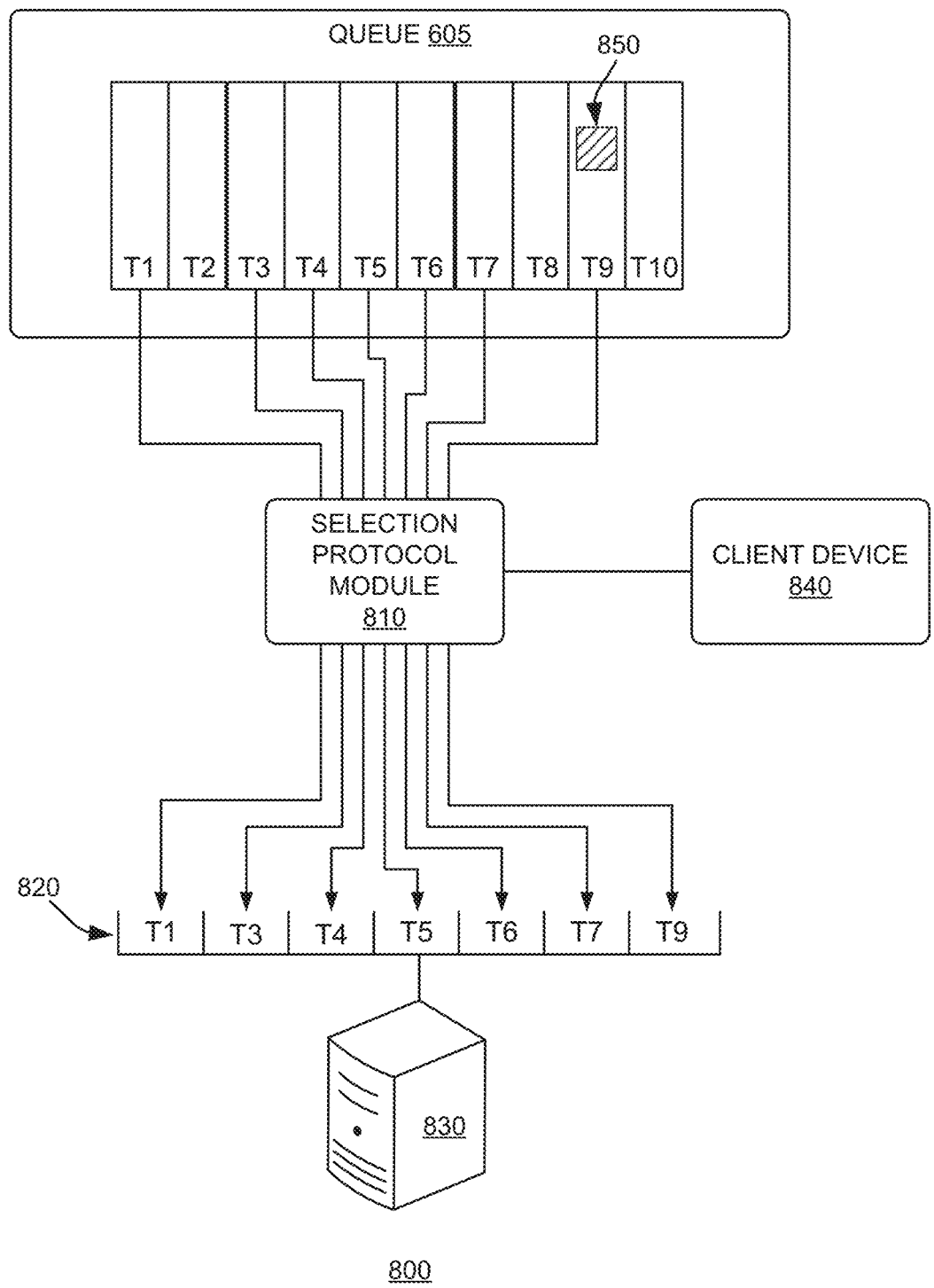
FIG. 8 illustrates a simplified high level diagram of a system that prioritizes tasks to be selected for processing cycles, in accordance with an embodiment.

FIG. 8 depicts a simplified high level diagram of a system 800 for implementing dynamic task selection using SDI instance 206. System 800 may include one or more servers 830 that store instructions that, when executed, enable SDI instance 206 to execute a selection protocol to dynamically select a subset of tasks stored in queue 605. The one or more servers 830 may include a defined number of server threads 820 for processing the selected tasks. As only a non-limiting example and for the purpose of illustration, FIG. 8 shows that one or more servers 830 may be configured with seven server threads 820, which enables the one or more servers 830 to concurrently process seven tasks. Further, in the example illustration of FIG. 8, queue 605 is configured to store 10 tasks, including T1 through T10. Tasks T1 through T10 may be tasks associated with one or more requests for one or more cloud services. For example, tasks T1 through T8 may be tasks for closing orders of various cloud services, task T9 may be a task for provisioning a cloud service, and T10 may be a task for provisioning another cloud service.

In certain embodiments, SDI instance 206 can execute the selection protocol using selection protocol module 810. Executing the selection protocol enables SDI instance 206 to calculate the due time for each task stored in queue 605, and select the tasks that correspond to a due time that is below a threshold value. For example, the selection protocol may be code that includes instructions to execute an algorithm that calculates (for each task) the amount of time it should take to complete the task (e.g., due time). As a further example, the selection protocol may also include instructions to order the tasks stored in queue 605 from the shortest due time to the largest due time. In this example, for a given processing cycle, the selection protocols include instructions for selecting a group of tasks from the ordered tasks, such that the tasks in the group all correspond to due times that are below a threshold time value. In addition, for a new processing cycle (e.g., the next cycle), the selection protocol includes instructions for recalculating the due time for the tasks that were not selected for processing during the previous cycle. The algorithm included in the selection protocol increases the priority (e.g., by reducing the due time) of tasks that were not selected during the previous cycle. For example, for each processing cycle that a task is not selected for processing (e.g., because the task corresponded to a due time that was greater than the threshold), the due time for that task reduces (e.g., increases in priority) non-linearly.

In certain embodiments, each task in the subset of tasks stored in queue 605 may be selected because the task corresponds to a due time that satisfies a selection condition. For example, a selection condition may be a threshold time value. In this example, a task is selected for processing if the due time of the task is less than or equal to the threshold time value. The tasks stored in queue 605 that correspond to a due time that exceeds the threshold time value may not be selected for processing during the processing cycle. The tasks that are not selected during the processing cycle remain in the queue. Further, the due time for the tasks remaining in the queue is recalculated every processing cycle. For each instance a task is not selected in the previous processing cycle, the selection protocol includes instructions to increase the priority of that task.

Referring again to FIG. 8, selection protocol module 810 may execute the selection protocol. Executing the selection protocol may cause a due time to be calculated for each of tasks T1 through T10 stored in queue 605. Further, executing selection protocol may identify the calculated due times that satisfy a threshold condition. For example, satisfying the threshold condition may occur when the calculated due time is less than or equal to a threshold time value. In the non-limiting example illustration of FIG. 8, executing the selection protocol may cause the selection of T1, T3, T4, T5, T6, T7, and T9 because each of these tasks correspond to a calculated due time that satisfies a selection condition (e.g., the due time for each of T1, T3, T4, T5, T6, T7, and T9 is less than or equal to a threshold time condition). In some examples, the selection condition can select tasks that correspond to a calculated due time that is greater than or equal to a threshold time value, and thus, the present disclosure is not limited to selection conditions that select tasks with calculated due times that are less than or equal to the threshold. In some examples, the selection protocol is configured to select the same number of tasks as there are server threads in the one or more servers.

As illustrated in FIG. 8, server threads process tasks T1, T3, T4, T5, T6, T7, and T9 during a processing cycle. In the example of FIG. 8, one or more servers 830 can concurrently process tasks T1, T3, T4, T5, T6, T7, and T9. When the tasks T1, T3, T4, T5, T6, T7, and T9 have been processed, these tasks are removed from queue 605 (or at least the state of the tasks are changed to "completed"). In this example, tasks T2, T8, and T10 would still be stored in queue 605, and the remaining positions in the queue would be filled by new tasks for new requests. During the next processing cycle, the due time for each task stored in queue 605 would be recalculated. The selection protocol may include instructions to increase the weight of tasks T2, T8, and T10, which were not selected during the previous processing cycle. Increasing the weight of tasks T2, T8, and T10 may cause the due time that is calculated for each of tasks T2, T8, and T10 to be prioritized (e.g., shorter due times, which indicates that the tasks are more urgent or prioritized higher so as to be selected during the current processing cycle, or at least more likely to be selected during the current processing cycle). This approach of increasing the priority during the next cycle of tasks that were not selected during the previous cycle enhances request processing by preventing tasks from being unduly delayed for processing. In other words, each time a task is not selected for processing during a processing cycle, that task becomes more urgent (e.g., the due time is reduced) so that the tasks can be processed and the corresponding requests of the tasks can be completed.

As a non-limiting example, the selection protocol may include instructions that execute a selection algorithm, which calculates a due time for each task stored in queue 605. For instance, the selection algorithm may include at least Equation 1:

$$\text{due time} = T_{exp} \times C_1 + e^{T_{wait}} \times C_2 + A + B^{Tnum} \times C_3 + R^{Rnum} \times C_4$$

In certain embodiments, Equation 1 may be calculated for each task stored in queue 605. Further, in certain embodiments, the result of Equation 1 may be in units of seconds. $T_{exp}$ may be a value that represents an expected time for completing the processing of the task. The value for $T_{exp}$ may be determined using one or more machine-learning techniques, such as, for example, K-Means Clustering, Support Vector Machines algorithms, Apriori algorithms, Artificial Neural Networks, Random Forests, and so on. The machine learning techniques may generate one or more models based on an analysis of historical data associated with the particular task. For example, the $T_{exp}$ of a task for creating a new service (e.g., a "CreateGenericServiceTask" for a "CREATE" request) may be determined by evaluating the completion time for all previously completed tasks of that same type (e.g., the task for creating the new service). The one or more machine-learning techniques may be applied to the historical data of that particular task to generate an expected time for completing that task. As a non-limiting example, the expected completion time for a "CreateGenericServiceTask" for a "CREATE" request may be 575 seconds, and this determination would be made by evaluating the historical data of the "CreateGenericServiceTask" to calculate the expected time of completing the task. The expected completion time is dynamic in that as the historical data of a particular task changes, so too will the $T_{exp}$ value of that particular task. Further, $C_1$ may be a coefficient for the expected completion time.

In certain embodiments, $T_{wait}$ may represent a number of instances in which the task was not selected for processing by the selection protocol since the task was stored in queue 605. Continuing with the example illustrated in FIG. 8, if task T2 was initially stored in queue 605 before the selection of tasks for a processing cycle, and if task T2 was not selected during that processing cycle, the $T_{wait}$ value for task T2 may be "1" indicating that task T2 was not selected one time (e.g., in other words, over one processing cycle). If task T2 is not selected again during the next processing cycle, then the $T_{wait}$ value for task T2 may be "2." As cycles pass, and if task T2 is not selected, the $e^{T_{wait}}$ value will grow, which increases the urgency of completing the task. Further, in certain implementations, $C_2$ may be a negative coefficient, which causes an exponential penalty on the overall due time if the processing time for the task goes beyond the expected value. For example, the $e^{T_{wait}}$ value may be subtracted from the overall due time when the $C_2$ coefficient is a negative value, and the subtraction reduces the due time for the task, which increases the priority of processing the task. The coefficient values described herein are not limited to integer values, but may be non-integer values or any value, as well.

In certain embodiments, the A value may be a constant that is determined from historical data using an algorithm for the particular task. For example, the A value may be a function of a request type and a service type (e.g., A may equal a request type weight plus a service type weight). The weight for each request type and service type may be user defined, and may be defined to prioritize certain tasks during certain periods of time. For example, during periods of time when tasks relating to creating new services is important, the request type weight for "create" tasks (e.g., which provision services when processed) may have a weight of "0," which indicates a prioritized task. During this period, other tasks, such as "archive" or "delete" may have a weight of "30" and "20," respectively, so as to reduce the priority of these tasks by increasing the overall due time for these tasks.

In certain embodiments, $B^{Tnum} \times C_3$ may be a non-linear function (e.g., an exponential function) that prioritizes tasks that are associated with requests that are nearing completion. For example, this non-linear function may cause a task to be prioritized if that task is the last task to be processed from amongst a set of tasks associated with a request. The B value may be user defined (e.g., "1.1"). Further, the Tnum value may represent the number of tasks that are remaining to be executed from amongst the set of tasks associated with the request. For example, the "CREATE" request may be associated with 44 tasks. If a task is stored in the queue, and there are 31 tasks remaining to be processed from the set of 44 tasks, then $B^{Tnum} \times C_3$ may be $B^{31} \cdot C_3$ may be a coefficient (e.g., any value, integer or non-integer, and so on) that is defined to prioritize tasks when the associated request is nearing completion. In certain embodiments, the $B^{Tnum} \times C_3$ value may be decreased as the number of remaining tasks in the set of tasks associated with the request get lower. The impact of reducing the $B^{Tnum} \times C_3$ value may be to reduce the overall calculated due time for the task, which prioritizes the task.

In certain embodiments, $R^{Rnum} \times C_4$ may represent a non-linear function that causes the overall due time to increase with each instance that a task selected for processing fails. For example, a task for provisioning a cloud service may fail if the cloud infrastructure system does not have enough available virtual CPUs (vCPUs) for allocating to the requested cloud service. In this example, even though the task for provisioning the cloud service was selected for processing from the queue during a processing cycle, the task would fail due to an insufficient number of available vCPUs for provisioning the service. In certain embodiments, the SDI instance may be configured to automatically retry processing a failed task one or more times. To enhance the throughput of processing requests, the selection protocol increases the due time of the tasks that have failed. In some cases, when the cloud infrastructure system does not have a sufficient number of resources (e.g., memory or vCPUs) available to allocate for provisioning a service, waiting for more memory or vCPUs to become available may take a while (e.g., approximately two days). As a result, if the SDI instance frequently retried the failed task, the processing resources of the cloud infrastructure would be burdened by the requests. To avoid burdening the processing resources, the SDI instances may add to the due time of failed tasks, which has the effect of reducing the priority of the tasks, so that the tasks are retried at a later time when the likelihood of additional resources being available is increased. In certain embodiments, R may represent a constant (e.g., "1.41"), which may be user defined or determined using one or more machine-learning techniques that generate a model for an efficient retry policy. Rnum may represent a number of failed retry attempts for the task. Further, $C_4$ may represent a coefficient that is defined to lower the priority of the task (e.g., increases the overall due time of the task) if the task fails or continues to fail.

In certain embodiments, the SDI instance may process tasks in a non-preemptive manner. For example, when the SDI instance is processing a task, the processing of the task may not be interrupted until the processing of the task has completed. In certain embodiments, the selection protocol may be executed with a combination of coefficients. For example, the coefficients may be user defined or may be determined using an iterative searching program, such that the coefficients are determined based on a latency value. In certain embodiments, the coefficients may be determined based on one or more task processing simulations. For example, random numbers may be initially used as the coefficient values, and simulations of the SDI instance processing tasks may be performed. From this point, simulations can be performed with different coefficient values to determine whether the selection protocol can be enhanced.

In certain embodiments, client device 840 may transmit override signals to selection protocol module 810. The override signal(s), upon being received at selection protocol module 810, may change one or more aspects or features of the selection protocol. For example, client device 840 may transmit an override signal to selection protocol module 810 to change one or more coefficients of the selection protocol. Changing the protocols may have the impact of prioritizing or de-prioritizing certain components of the selection protocol. For example, during certain time periods, the throughput of request processing in the cloud infrastructure system may be enhanced by prioritizing "create" tasks that create and provision cloud services. In this example, client device 840 can transmit an override signal to selection protocol module 810 to change the value of the A coefficient to reduce the weight associated with "create" tasks and increase the weight associated with other tasks, such as "archive" tasks. The override signals may be generated based on user input (e.g., from a network administrator), or in some examples, may be generated automatically based on or in response to one or more conditions of the cloud infrastructure system. For instance, the override signal may be automatically generated and transmitted from client device 840 in response to detecting an overload condition of processing requests (e.g., the rate of receiving requests increases beyond a threshold). The override signal may cause the coefficients to be changed so as to increase the throughput of processing requests to address the overload condition.

In certain embodiments, a task may include or correspond to a tag that represents the priority of the task. For example, as illustrated in FIG. 8, task T9 may include or correspond to tag 850. Tag 850 may include code that represents a priority of task T9. For example, tag 850 may include code that, when evaluated by the SDI instance, indicates that task T9 is to be selected during the first processing cycle that arises after task T9 is stored in the queue. In another example, tag 850 may include code that, when evaluated by the SDI instance, indicates that task T9 has a low priority, and thus, other tasks can be selected for processing during a processing cycle before task T9, if those tasks have a similar or same due time as task T9. In some implementations, tag 850 may be evaluated together with the calculated due time for task T9 to determine whether to select task T9 for processing. In some implementations, tag 850 may be evaluated to determine whether to select task T9 for processing, and the due time for task T9 would not need to be evaluated or would not need to be calculated. In some implementations, tag 850 may not be evaluated to determine whether to select task T9 for processing, and the due time for task T9 would be evaluated in lieu of tag 850.

Figure 9:
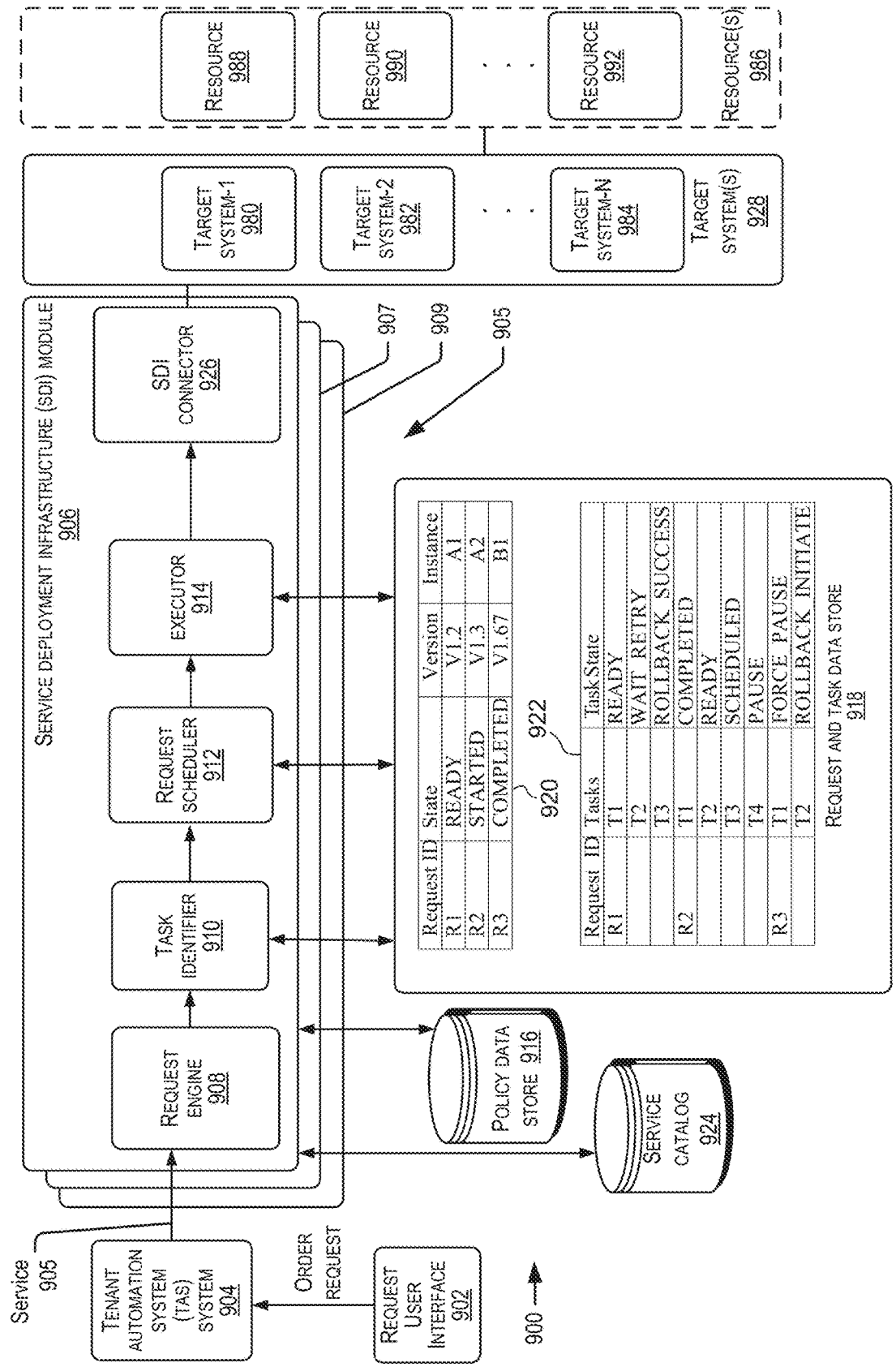
FIG. 9 illustrates a simplified high level diagram of a system including SDI instances for managing request processing, in accordance with an embodiment.

FIG. 9 depicts a simplified high level diagram of a system 900 within and/or accessible to SDI instance 206 of a cloud infrastructure system. System 900 may include one or more servers 930 that are SDI instance 206 may perform the tracking, management and provisioning of services subscribed to by customers of the cloud infrastructure system, in accordance with an embodiment of the present disclosure. In the embodiment depicted in FIG. 9, the SDI instance includes a request engine 908, a task identifier 910, a request scheduler 912, a request and task executor 914, a request and task data store 918, a policy data store 916, a service catalog 924 and an SDI connector 926. These components may be implemented in hardware, or software, or combinations thereof. In other embodiments, a module may have one or more subsystems or components. System 900 may include more or fewer modules than shown in FIG. 9, may combine two or more modules, or may have a different configuration or arrangement of modules. Additional respective SDI instances 907 and 909 may have similar functionality as SDI instance 906. However, as disclosure herein, each of SDI instances 906, 907, and 909 may have differing and/or overlapping functionality. For example, SDI instance 907 may have additional functionality that may be lacking within SDI instance 906. The different functionality may take the form of being able to process a different version of a task, for example. Although SDI instance 906 will be discussed in detail, each of SDI instances 907 and 909 may include similar functionality as described regarding SDI instance 906.

Request Processing

In accordance with some embodiments, SDI instance 906 may be configured to perform the scheduling and processing of order requests from TAS system 904. SDI instance 906 may perform operations described with reference to SDI throughout this disclosure, such as SDI instance 206.

In the embodiment shown in FIG. 9, TAS system 904 receives an order request from a customer via a request user interface (UI) 902. For instance, a customer may access a cloud user interface (UI) (e.g., 212, 214 and/or 216 shown in FIG. 2) in request UI 902 and place a subscription order via the UI. Order request may include subscription information about a subscription order. TAS system 904 may then be configured to perform the initial processing of the order. For example, TAS system 904 may identify processes associated with the order and apply logic to determine whether the order should proceed to provisioning. Once TAS system 904 determines that the order for the customer should be provisioned, TAS system 904 communicates the order request to SDI instance 906. The order request may be for a cloud service 905. For instance, TAS system 904 may interact with SDI instance 906 via a communication protocol, such as an asynchronous Simple Object Access Protocol (SOAP). TAS system 904 may send a SOAP request to SDI instance 906 to enable the provisioning of the order request for the customer.

Upon receiving the order request from TAS system 904, in some embodiments, request engine 908 in SDI instance 906 identifies one or more services specified in the order request. As a non-limiting example, request engine 908 may identify that the order request includes a CRM service and a Java service. In some embodiments, SDI instance 906 may include a task identifier 910. Task identifier 910 may be configured to identify a set of tasks for each service specified in the order request. In some examples, the tasks identified by task identifier 910 for an order request may be service specific and vary from one service to another. For instance, task identifier 910 may be configured to identify a first set of tasks for a first service specified in the order request and a second set of tasks for a second service specified in the order request.

As illustrated, requests can be associated with varying numbers of tasks to perform each request. Certain tasks can be associated with provisioning resources to enable a service request. In certain embodiments, resource provisioning tasks are performed sequentially in an order specified for each request type in order to violate resource allocation dependencies associated with provisioning the resources. Alternatively, one or more tasks can be performed in parallel. Each service request can, via a policy, be delineated into a plurality of tasks. The policy can determine which tasks are to be performed, the order of the tasks, or other information related to performance of the tasks. For example, a policy can include one or more processes for provisioning a service. Each of the processes can be associated, via a policy, with a plurality of tasks, as disclosed herein.

As described in the figures and description above, each of the tasks associated with various requests can be stored in a queue. Each processing cycle (e.g., every five seconds) a group of tasks may be selected from the tasks stored in the queue. A selection protocol module can generate a due time for each task stored in the queue. The generated due time may represent the how soon (e.g., in seconds) the corresponding task should be completed. Tasks with shorter due times may have a higher priority than tasks with longer due times, and accordingly, the SDI instance may select a group of tasks that have the highest priority over the other tasks in stored in the queue. Each cycle the SDI instance may select the group of tasks with the shortest due times (e.g., the tasks corresponding to the shortest 300 due times from a ranking of shortest due time to longest due time). Further, each cycle, the due time for each tasks may be updated. For example, if a task is stored in the queue, but is not selected during a cycle, the due time of that task may get shorter for the next processing cycle to increase the likelihood that the task is selected for processing for the next processing cycle.

When a request for a service is received by an SDI instance, the SDI instance can determine one or more processes for enabling the requested service. Some of these processes can be for provisioning one or more resources. Each process can be further delineated into a plurality of tasks. Each task can be an atomic task of a process. When each of the tasks is completed, the process can be completed. Certain tasks can attempt to provision a certain resource or type of resource. A process can define or otherwise be associated with a number of tasks and/or an order of tasks to complete the process.

Resources can include, but are not limited to, computer resources (e.g., memory, processing allocation, network ports, etc.), software products, applications (e.g., cloud-based applications, enterprise applications, or any other applications), cloud services, various types of data (e.g., networked files, directory information, databases, or the like), and other resources. In some embodiments, resources may include one or more computer systems, databases, lightweight directory access protocol (LDAP) servers, Active Directory (AD) systems, Email Systems, UNIX systems and the like. For example, a target system may be an Active Directory (AD) system that provides access to active directory services to access an Active Directory server. Resources can also be organized by and/or be a resource manager including one or more target systems/resources. For example a resource manager can be a database or virtual machine resource manager comprising multiple database and/or virtual machine resources. It should be understood that a resource manager can be arranged in a multitude of arrangements and are not limited to being arranged only by resource type. A resource manager can request its own resources.

Upon identifying a set of tasks to enable a service identified in the order request, task identifier 910 stores information related to the order request and the identified tasks associated with the order request in a request and task data store 918. In the embodiment depicted in FIG. 9, request and task data store 918 may include a request information table 920 and a request-task information table 922. Request information table 920 may store information such as a request ID and a request state. For instance, R1 may correspond to a first service request (e.g., ODBC service) specified in the order request, R2, may correspond to a second service request (e.g., JAVA service) specified in the order request, R3 may correspond to a third service request (CRM service) specified in the order request, and so on.

In certain embodiments, each of SDI instances 906, 907, and 909 may have access to the same request and task data store 918. Each service request (e.g., service request R1, R2, and/or R3) may be assigned a corresponding version and/or instance ID. A version number may indicate a version of SDI instance that may be required to process the request. For example, service request R1 is assigned a version of V1.2 and may be processed by SDI module 909 but not SDI instance 907 (assuming SDI instance 909 is a V1.2 SDI instance and SDI instance 907 is not). In certain embodiments, an SDI instance may be configured to process versions up to an including a version number of the SDI instance (e.g., an SDI instance version may be backwards compatible with previous versions of SDI instance).

Any combination SDI instances 906, 907, or 909 may be active or inactive at a given time. Furthermore, any of SDI instances 906, 907, or 909, when active, may be configured to process a number of order requests to a computer infrastructure system, such as system 900. An SDI instance may be inactive when it is being modified, for example. As disclosed herein, a modification can include updating the SDI instance to provide additional functionality, correct faults, etc. Using a plurality of SDI instances (e.g., 906, 907, and 909) that can each service a computer infrastructure system allows redundancy in SDI functionality and can enable a zero downtime SDI. When one SDI instance is unavailable due to modification, other SDI instances can be active and able to service order requests of system 900.

As one example, SDI instance 906 can be assigned a version number V1.2 and SDI instance 909 may have the same version number V1.2. Thus, SDI instances 906 and 909 may have similar functionality and may be able to service requests interchangeably. A modification may be desired to be applied to SDI instance 906 to, for example, roll the version number to V1.3. While SDI instance 906 is unavailable during modification, SDI instance 909 may be able to service order requests in place of SDI instance 906. When the modification of SDI instance to V1.3 is complete, then SDI instance 909 can be modified and, assuming that V1.3 is backwards compatible with V1.2, SDI instance 906 can service order requests that were previously being service by SDI instance 909 during modification of SDI instance 909.

An instance identifier may be associated with a specific service request. An instance identifier may be a unique identifier to identify a certain SDI instance or a certain SDI instance from within a group of SDI instances. As one example, SDI instances can be grouped by version number. Such a grouping can be used to, for example, select a certain instance that may have unique capabilities, distribute service requests among SDI instances, account for if a certain instance of a version of SDI instance is unavailable but a corresponding version compatible SDI instance is available, etc. For example, assuming that a certain service request requires a certain version of SDI instance to service the certain service request (e.g., V1.2). Also assume that an SDI instance of V1.2 is unavailable due to a fault of hardware implementing the SDI instance, the SDI instance being modified, etc. If so, then another SDI instance may be able to service the certain service request. The instance identifier may be used to select an instance having a same version or a version that is backwards compatible with the desired version of SDI instance to service the certain service request. For example, an instance identifier may corresponding to an SDI instance of V1.3 which may be backwards compatible with V1.2. An instance identifier can serve many purposes and may be used to assign a specific service request to a specific SDI instance.

In certain embodiments, request information table 920 may store 'state' information associated with each request. Various states may be associated with a request. These states may include, for example without limitation, a 'ready' state to indicate a creation of a request in the database (e.g., request and task data store 918), a 'started' state to indicate that a task associated with the request is currently executing, a 'completed state' to indicate the state of the request after all tasks identified for the request have been completed, a 'pausing' state to indicate that the request is deprecated or suspended, a 'paused' state to indicate that a task associated with the request has failed, a 'cancelling' state to indicate that the request has started cancelling, a 'cancelled' state to indicate that the request has been cancelled, a 'cancel paused' state to indicate that the request to cancel the request has failed, a 'cancel interrupted' state to indicate that the request to cancel was interrupted, a 'wait continue' state to indicate that the request is waiting in a queue and so on.

In some embodiments, request-task information table 922 may store information about tasks associated with a request. For instance, request-task information table 922 may identify for each request, each of the tasks for enabling a service for the request and the 'state' of execution that the task is currently in. In an embodiment, the tasks associated with each request may be executed in a serialized manner according to a process for provisioning to enable a service. The Process may define an order for execution of the tasks. However, the requests (e.g., R1, R2 and R3) itself may be processed by request engine 908 in parallel. SDI instance 906 may be configured to receive multiple order requests simultaneously from TAS system 904, in certain embodiments. Additionally, while the embodiment depicted in FIG. 9 illustrates different services (R1, R2, R3) specified in a single order request, in other embodiments, the order request may specify only a single request. Although not illustrated, tasks may be assigned differing version and/or instance identifiers that may supplement or take the place of version or instance identifiers of requests.

As noted above, in certain embodiments, various states may be associated with a task. These states may include, for instance, a 'ready' state to indicate the creation of a task associated with a request, a 'started' state to indicate that a task has begun executing, a 'wait-retry' state to indicate that a task has failed and is waiting in the queue to retry, a 'wait-continue' state to indicate that a task has not yet completed and is waiting in the queue, a 'completed' state to indicate that a task has completed, a 'failed' state to indicated that a task has failed and that there are no more retries available for the task, a 'rollback-success' state, a 'rollback-failed' state, a 'rollback-fail-skipped' state and so on. In some embodiments, the states associated with a task may include a 'failed' state to indicate that the task has failed, a 'success' state to indicate that the task has completed, an 'incomplete' state to indicate that the task is incomplete, a 'rollback success' state to indicate that a rollback operation performed for the task was successful, a 'rollback failed' state to indicate that a failure of a rollback operation performed for the task, a 'force paused' state and so on.

Request Scheduling

In accordance with certain embodiments, request scheduler 912 may be configured to schedule the execution of requests according to a time period (e.g., a cycle of every 5 seconds). The time period may be pre-specified, being defined by one or more intervals of time. For instance, request scheduler 912 may be configured with a timer to select a request for execution every 5 seconds from request information table 920. Upon identifying a request to execute, request scheduler 912 may then be configured to update the 'state' of the request. For instance, request scheduler 912 may be configured to update the state of the request from a 'ready' state to a 'started' state to begin execution of the request.

In certain embodiments, executor 914 may be configured to identify one or more tasks associated with a request and begin execution of the tasks associated with the request using the embodiments for task weighting as described above. For instance, executor 914 may be configured to pick up a first task identified in a list of tasks associated with the request when the first task has the shortest due time, and update the state of the task. For example, executor 914 may be configured to update the state of the task from a 'ready' state to a 'started' state to begin execution of the task.

Policies to Control Flow of Requests

In certain embodiments, an SDI instance may include a service catalog 924. The service catalog can store information related to types of services that a customer of the cloud infrastructure system may subscribe to. Services may include, for example, Customer Relationship Management (CRM) services (e.g., Fusion CRM services provided by the Oracle cloud), Human Capital Management (HCM)/Talent Management services and the like. CRM services may include services directed to reporting and management of a sales activity cycle to a customer, and others. HCM/Talent services may include services directed to providing global workforce lifecycle management and talent management services to a customer.

As disclosed herein, SDI instance 906 can delineated a service request into one or more processes. Each process can be further delineated into one or more tasks. Some tasks and/or processes can provision resources to enable a service. SDI instance 906 can also implement an error handling policy of a cloud infrastructure including performing error handling according to rule(s) of the error handling policy. The rule(s) can contain certain error handling procedures depending upon an error type and/or resource type associated with each task. Thus, during the flow of execution of a plurality of tasks to enable requests, SDI instance 906 can collect error types and/or resource types for error, consult an error handling policy, and implement, in an automated fashion, error handling procedures.

In certain embodiments, A mapping can be maintained between a task and a request thread. In the event of server downtime, when a request is running, SDI instance 906 can detect a halted request and re-process it. SDI instance 906 may be configured to perform retries on failed tasks based on retry rules defined per task with a retry interval and retry duration, delay one or more tasks based on a delay time duration based on delay rules, add/or perform rollback error handling procedures based on rollback rules.

Request Management

In certain embodiments, SDI instance 906 may perform request management. For instance, a user (e.g., an administrator) of the cloud infrastructure system can pause, resume or cancel a request. The administrator can list and get tasks details of a request. When the cloud infrastructure system is not able to recover from a failed task, the administrator may be given the option to forcibly skip the failed task and let the request engine pick up the next task. In certain situations, an administrator can abort a running request. The aborted request is not processed again to ensure no inappropriate action taken.

SDI connector 926 includes one or more connectors for handling the deployment of tasks specified by executor 914 to provision one or more services related to the order request. In certain embodiments, one or more of the connectors may handle tasks that are specific to a particular service type while other connectors may handle tasks that are common across different service types. In one embodiment, SDI connector 926 includes a set of connectors (wrapper APIs) that interface with one or more target systems 928 in the cloud infrastructure system to provision the services and resources related to the order request. For example, an Application Express (APEX) connector may interface with an APEX deployer module in target systems 928 to provision database services. A Web Center Connector (WCC) may interface with a web center module in target systems 928 to provision web services. For example, the web center module may be a user engagement platform that includes capabilities for delivering connectivity between people and information in cloud infrastructure system.

Target systems 928 can include, but are not limited to, software products, applications (e.g., cloud-based applications, enterprise applications, or any other applications), cloud services, various types of data (e.g., networked files, directory information, databases, or the like), resource managers, and other resources. In some embodiments, target systems may include one or more computer systems, databases, lightweight directory access protocol (LDAP) servers, Active Directory (AD) systems, Email Systems, UNIX systems and the like. For example, a target system may be an Active Directory (AD) system that provides access to active directory services to access an Active Directory server. Target systems can also be organized by and/or be a resource manager including one or more target systems/ resources. For example a resource manager can be a database or virtual machine resource manager comprising multiple database and/or virtual machine resources. It should be understood that resource manager can be arranged in a multitude of arrangements and are not limited to being arranged only by resource type. A resource manager target system can request its own resources. For example, target system-1 980 is illustrated as being associated with resource 988 of resource(s) 986. Resource(s) 986 may also include may include one or more databases, lightweight directory access protocol (LDAP) servers, Active Directory (AD) systems, Email Systems, UNIX systems and the like), or other resources. As another example, target system-2 982 may be associated with resource 990 of resource(s) 989, and target-system-N 984 may be associated with resource 992 of resource(s) 986.

Figure 10:
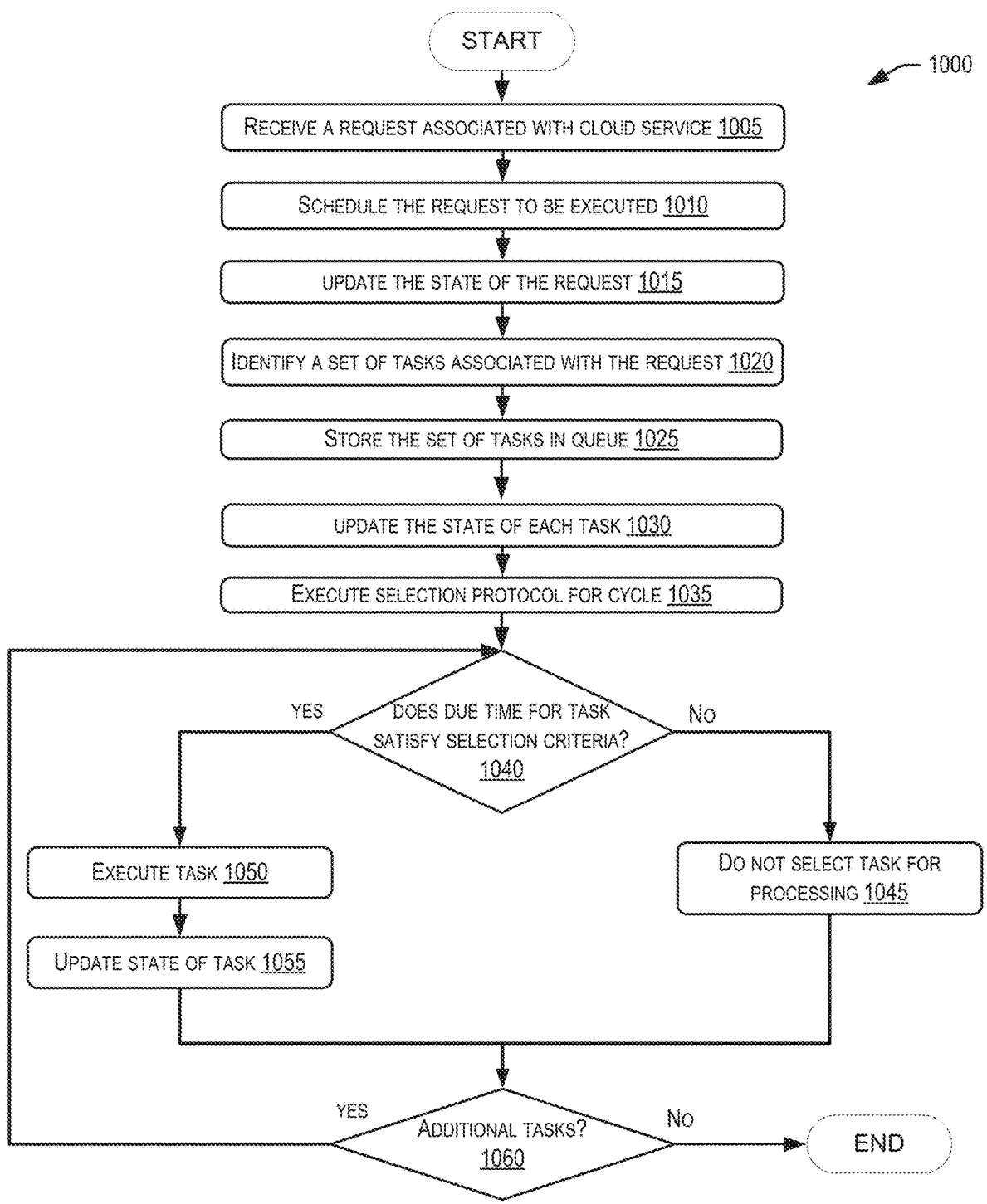
FIG. 10 illustrates a flow diagram of an example process for processing and scheduling service requests by a computer infrastructure system, in accordance with an embodiment.

FIG. 10 illustrates a flow diagram of an example process 1000 according to some embodiments. Process 1000 may be implemented by a cloud infrastructure system, including an SDI instance.

At 1005, the SDI instance can receive a request from the TAS. Examples of the request can include a request for provisioning a cloud service, a request for updating an existing cloud service (e.g., with one or more new features), a request for deleting an existing cloud service, a request for archiving data associated with an existing cloud service, and other suitable requests associated with a cloud service. Request information can be stored in a database. This information can be accessed by an SDI instance. At 1010, the request can be scheduled. The scheduling of the requests can occur in the order in which they were requested, in another order, at a set frequency, at set or variable intervals, concurrently, or in any combination of the preceding. After the requests are scheduled, their status can be updated accordingly, at 1015, to avoid another instance of SDI instance from attempting to process the request, for example. In certain embodiments, the state of the request can be updated within a database shared by multiple instance of SDI instances.

At 1020, a set of tasks associated with the request can be identified. For example, the list of tasks that need to be performed to complete the request can be identified, as described in the present disclosure. The set of tasks may include one or more tasks. In some cases, the task can be identified from a data store, such as request and task data store 918. At 1025, the set of tasks can be individually stored in a queue, such as queue 605. For example, each task may be stored at a queue position of the queue. In some cases, a task stored in the queue may be associated with a tag, such as tag 850. At 1030, a state of the task can be updated in the data store to indicate that the task is stored in the queue ready for processing, for example. At 1035, the selection protocol module can execute the selection protocol. The selection protocol may include code that, when executed, causes a selection algorithm, such as the algorithm described in FIG. 8, to generate a due time for each task stored in the queue. For example, the generated due times can be stored in a data structure (e.g., a table) accessible by or associated with the SDI instance or the selection protocol module.

At 1040, an automated decision may be made as to whether the due time for a task satisfies a selection condition. In some examples, the SDI instance or the selection protocol module may execute the automatic decision. Further, the decision may be sequentially made for each task stored in the queue, or concurrently made for two or more tasks stored in the queue. In certain embodiments, and as described in the present disclosure, satisfying the selection condition may occur when the due time is below a threshold time value (e.g., below 575 seconds). In certain embodiments, satisfying the selection condition may occur when the due time for a task is within the shortest X number of due times, where X is the number of server threads available for processing the task (e.g., the due time for a task is within the 300 shortest due times for the tasks stored in the queue, in a case where there are 300 available server threads for processing tasks). In certain embodiments, the selection condition may be whether or not a task is associated with a tag. For example, if the task is associated with a tag representing a high priority, then the task may be selected for processing during the current cycle. It will be appreciated that a plurality of selection protocols or selection conditions may be used at step 1040. At 1045, if the due time for the task does not satisfy the selection condition, the corresponding task is kept in the queue and not selected for processing during the current processing cycle. The task remains in the queue and is available for selection to be processed for the next cycle. At 1050, if the task is selected for processing during the current cycle, the task is processed (e.g., executed). At 1055, the state of the task can be updated to indicate that the task is complete, in-progress, faulted, etc. At 1060, a determination can be made if additional tasks are associated with the service request that are stored in the queue. If so, process 1000 can process to decision branch 1040 to identify and execute the additional tasks until they are complete.

Various example computer resources that be provisioned include databases, racks, external services, or virtual machines. A database can further be broken into a schema, a cluster database instance, or a single instance database. A cluster database instance can be a logical construct of multiple databases or database instances that are logically arranged as a group. This group can be arranged by having resources with like characteristics, being physically co-located, or in any other manner. By clustering databases, the databases can be easier managed by the computer infrastructure system. Rules can be applied to groups of databases instead of to each individual database, for example.

A rack can be an example virtual construct of various resources within a computer infrastructure system. A rack can contain memory, CPUs, server pools, or other devices or logical constructs within a computer infrastructure system. An instance of a rack can be implemented as including a specific set of resources that can commonly be used to enable one or more services or service types. Racks can dynamically be altered or updated by the computer infrastructure as needed to meet the various demands of the services of the computer infrastructure system. By defining racks, provisioning of resources can be simplified. For example, a task can request a rack type in place of a set of tasks that each request provisioning of a resource of a rack. Racks can include variously defined network domains of resources such as, a subnet, gateway, or a server pool.

External resources can include various resources external to the computer infrastructure system. For example, various hosts or subnets can be interfaced via the computer infrastructure system to provide specialized needs or additional capacity to the computer infrastructure system. Still other specialized resources can also be defined within the computer infrastructure system. For example, a virus scanning resource can be embedded within the computer infrastructure system that they can be requested by one or more tasks determine if a virus exists within a requested resource prior to enabling a service. Furthermore, a virus scanning utility can be requested as part of a service to continually enable virus scanning after the service is enabled. Likewise, a notification system can be embedded within a computer infrastructure system to enable notification functionality for a given service. For example, user can be notified where there is an error or a predefined result user may request. Still yet another example is a global monitoring database. Such a database can be used to provide monitoring functionality for a service. The monitoring functionality can enable the service owner to debug or otherwise have insight into the functionality of the service in order to detect or correct errors, update resources as needed, collect information from a service or portion of the service.

Figure 11:
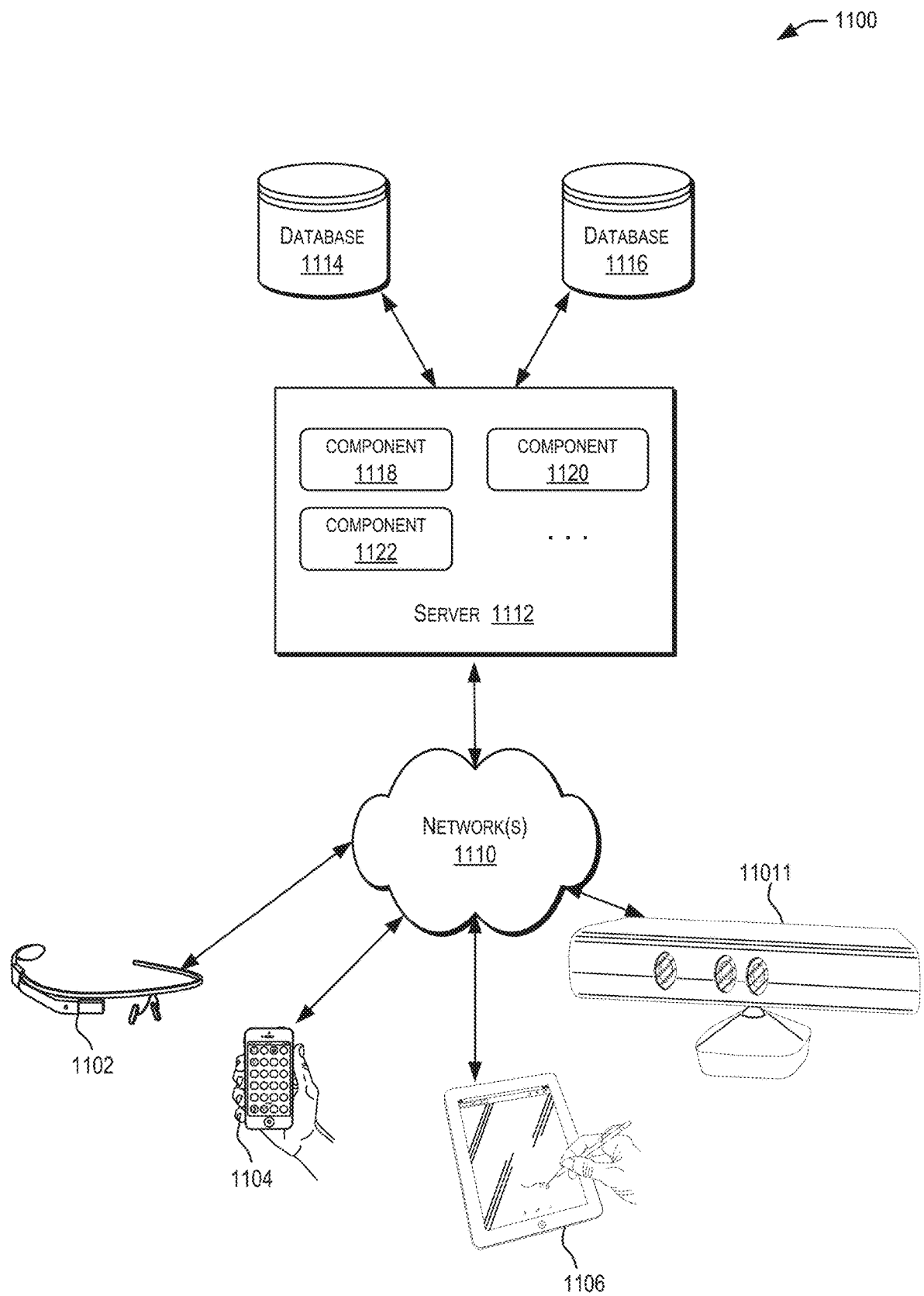
FIG. 11 illustrates a simplified diagram of a distributed system for implementing an embodiment of the present disclosure.
Figure 12:
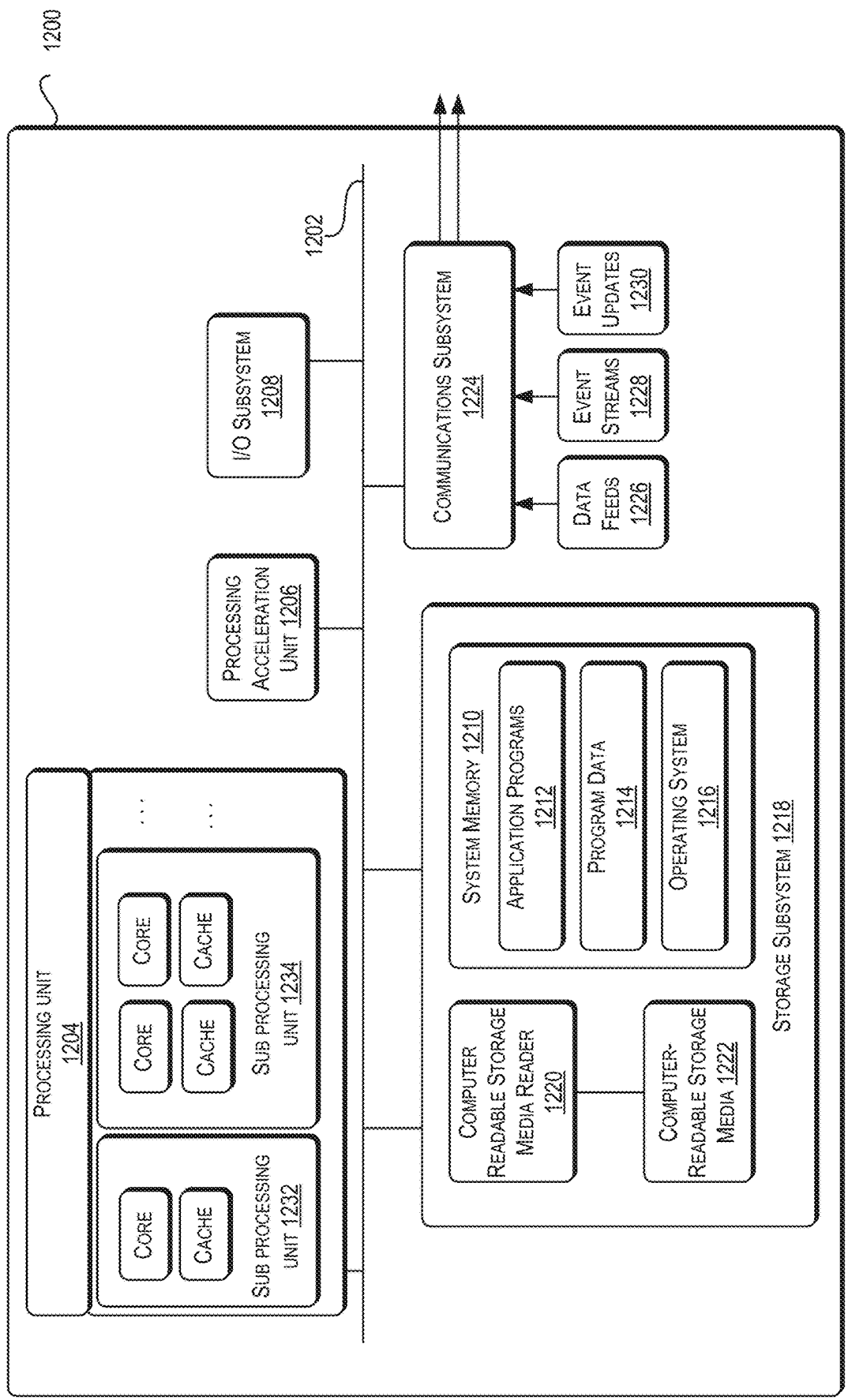
FIG. 12 illustrates an exemplary computer system that may be used to implement an embodiment.

FIGS. 11 and 12 illustrate aspects of example environments for implementing aspects of the present disclosure in accordance with various embodiments. FIG. 11 depicts a simplified diagram of a distributed system 1100 for implementing an embodiment of the present disclosure. In the illustrated embodiment, the distributed system 1100 includes one or more client computer devices 1102, 1104, 1106, and 1108, which are configured to execute and operate a client application such as a web browser, proprietary client (e.g., Oracle Forms), or the like over one or more network(s) 1110. The server 1112 may be communicatively coupled with the remote client computer devices 1102, 1104, 1106, and 1108 via network 1110.

In various embodiments, the server 1112 may be adapted to run one or more services or software applications such as services and applications that provide identity management services. In certain embodiments, the server 1112 may also provide other services or software applications can include non-virtual and virtual environments. In some embodiments, these services may be offered as web-based or cloud services or under a Software as a Service (SaaS) model to the users of the client computer devices 1102, 1104, 1106, and/or 1108. Users operating the client computer devices 1102, 1104, 1106, and/or 1108 may in turn utilize one or more client applications to interact with the server 1112 to utilize the services provided by these components.

In the configuration depicted in FIG. 11, the software components 1118, 1120 and 1122 of system 1100 are shown as being implemented on the server 1112. In other embodiments, one or more of the components of the system 1100 and/or the services provided by these components may also be implemented by one or more of the client computer devices 1102, 1104, 1106, and/or 1108. Users operating the client computer devices may then utilize one or more client applications to use the services provided by these components. These components may be implemented in hardware, firmware, software, or combinations thereof. It should be appreciated that various different system configurations are possible, which may be different from distributed system 1100. The embodiment shown in FIG. 11 is thus one example of a distributed system for implementing an embodiment system and is not intended to be limiting.

The client computer devices 1102, 1104, 1106, and/or 1108 may include various types of computer systems. For example, client device may include portable handheld devices (e.g., an iPhone®, cellular telephone, an iPad®, computer tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computer devices may also include general purpose personal computers including, by way of example, personal computers and/or laptop computers running various versions of Microsoft Windows®, Apple Macintosh®, and/or Linux operating systems. The client computer devices can be workstation computers running any of a variety of commercially-available UNIX® or UNIX-like operating systems, including without limitation the variety of GNU/Linux operating systems, such as for example, Google Chrome OS. Client computer devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1110.

Although distributed system 1100 in FIG. 11 is shown with four client computer devices, any number of client computer devices may be supported. Other devices, such as devices with sensors, etc., may interact with the server 1112.

The network(s) 1110 in the distributed system 1100 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1110 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1112 can include one or more virtual machines running virtual operating systems, or other computer architectures involving virtualization. One or more flexible pools of logical storage devices can be virtualized to maintain virtual storage devices for the server. Virtual networks can be controlled by the server 1112 using software defined networking. In various embodiments, the server 1112 may be adapted to run one or more services or software applications described in the foregoing disclosure. For example, the server 1112 may correspond to a server for performing processing as described above according to an embodiment of the present disclosure.

The server 1112 may run an operating system including any of those discussed above, as well as any commercially available server operating system. Server 109 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 1112 may include one or more applications to analyze and consolidate data feeds and/or event updates received from users of the client computer devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1112 may also include one or more applications to display the data feeds and/or real-time events via one or more display devices of the client computer devices 1102, 1104, 1106, and 1108.

The distributed system 1100 may also include one or more databases 1114 and 1116. These databases may provide a mechanism for storing information such as user identity information, and other information used by embodiments of the present disclosure. Databases 1114 and 1116 may reside in a variety of locations. By way of example, one or more of databases 1114 and 1116 may reside on a non-transitory storage medium local to (and/or resident in) the server 1112. Alternatively, the databases 1114 and 1116 may be remote from the server 1112 and in communication with the server 1112 via a network-based or dedicated connection. In one set of embodiments, the databases 1114 and 1116 may reside in a storage-area network (SAN). Similarly, any necessary files for performing the operations attributed to the server 1112 may be stored locally on the server 1112 and/or remotely, as appropriate. In one set of embodiments, the databases 1114 and 1116 may include relational databases, such as databases provided by Oracle, that are adapted to store, update, and retrieve data in response to SQL-formatted commands.

FIG. 12 illustrates an exemplary computer system 1200 that may be used to implement an embodiment of the present disclosure. In some embodiments, computer system 1200 may be used to implement any of the various servers and computer systems described above. As shown in FIG. 12, computer system 1200 includes various subsystems including a processing subsystem 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 may include tangible computer-readable storage media 1222 and a system memory 1210.

Bus subsystem 1202 provides a mechanism for letting the various components and subsystems of computer system

1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processing units 1232, 1234, etc. A processing unit may include be one or more processors, including single core or multicore processors, one or more cores of processors, or combinations thereof. In some embodiments, processing subsystem 1204 can include one or more special purpose co-processors such as graphics processors, digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 1210 including potentially on one or more storage devices. Through suitable programming, processing subsystem 1204 can provide various functionalities described above for dynamically modifying documents (e.g., webpages) responsive to usage patterns.

In certain embodiments, a processing acceleration unit 1206 may be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term "input device" is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information that is used by computer system 1200. Storage subsystem 1218 provides a tangible non-transitory computer-readable storage medium for storing the basic programming and data constructs that provide the functionality of some embodiments. Software (programs, code modules, instructions) that when executed by processing subsystem 1204 provide the functionality described above may be stored in storage subsystem 1218. The software may be executed by one or more processing units of processing subsystem 1204. Storage subsystem 1218 may also provide a repository for storing data used in accordance with the present disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM) or dynamic random access memory (DRAM).

By way of example, and not limitation, as depicted in FIG. 12, system memory 1210 may store application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1222 may store programming and data constructs that provide the functionality of some embodiments. Software (programs, code modules, instructions) that when executed by processing subsystem 1204 a processor provide the functionality described above may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1222 may provide storage of computer-readable instructions, data structures, program modules, and other data for computer system 1200.

In certain embodiments, storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for storing computer-readable information.

In certain embodiments, computer system 1200 may provide support for executing one or more virtual machines. Computer system 1200 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1200. Accordingly, multiple operating systems may potentially be run concurrently by computer system 1200. Each virtual machine generally runs independently of the other virtual machines.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices. For example, the account management system 112 depicted in FIG. 1 may receive user login information including input related to a training word from client devices using communication subsystem 1224. Additionally, communication subsystem 1224 may be used to communicate notifications of successful logins or notifications to re-enter a password from the account management system 112 to the requesting users.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, communications subsystem 1224 may receive input communication in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computer tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Although specific embodiments of the present disclosure have been described, various modifications, alterations, alternative constructions, and equivalents are also encompassed within the scope of the present disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A computer-program product tangibly embodied in a non-transitory machine-readable storage medium, including instructions configured to cause a data processing apparatus to perform operations including:
   receiving a provisioning request associated with a client, the provisioning request being a request to perform a set of tasks, and each task of the set of tasks corresponding to a cloud application;
   storing each task of the set of tasks in a queue, the queue storing the set of tasks to be processed;
   executing a selection protocol that generates an initial weight for each task of the set of tasks, the initial weight for the task being based on a variable characterizing the task at a particular time, and the initial weight indicating a due time for processing the task, and processing of the task being due at the due time;
   selecting a first subset of tasks from amongst the set of tasks stored in the queue, each task in the first subset of tasks being selected based on the initial weight assigned to the task;
   processing each task in the first subset of tasks during a first processing cycle, the processing causing each task in the first subset of tasks to be completed and removed from the queue;
   identifying a task from amongst the set of tasks, the identified task having not been selected for processing in the first subset of tasks;
   determining a number of times the task was previously not selected for processing;
   updating the initial weight assigned to the task based on the number of times the task was not selected for processing;
   selecting a second subset of tasks from amongst one or more tasks remaining in the queue after the selection of the first subset of tasks, the second subset of tasks including the task that was not selected for processing in the first subset of tasks, and the task being selected in the second subset of tasks due to the increased priority associated with the task;
   updating the initial weight for each task included in the second subset of tasks, the initial weight being updated based on a change of the variable associated with the task at a later time, and the updated initial weight representing a new due time for processing the task; and
   processing each task in the second subset of tasks during a second processing cycle.

2. The computer-program product of claim 1, wherein, for each task of the set of tasks, the selection protocol is configured to calculate any combination of:
   an expected completion time for the task;
   a number of instances the task was not selected to be included in a subset of tasks for processing;
   a number of instances of the set of tasks that have not been processed; and
   a number of instances the processing of the task has failed.

3. The computer-program product of claim 1, further comprising:
   generating a model by executing one or more machine-learning algorithms, the model representing an expected completion time for each task in the set of tasks.

4. The computer-program product of claim 1, further comprising:
   receiving an override signal that overrides an initial weight assigned to a task of the set of tasks, the override signal causing the initial weight to be replaced with a new weight value.

5. The computer-program product of claim 1, wherein the set of tasks are associated with provisioning the cloud application.

6. The computer-program product of claim 1, wherein the queue stores an additional set of tasks associated with an additional provisioning request received from another client, and wherein the first subset includes at least one task from the additional set of tasks.

7. The computer-program product of claim 1, wherein the set of tasks includes a first task and a second task, wherein the first task is included in the first subset and the second task is included in the second subset, but not the first subset, and wherein the initial weight of the second task is updated to indicate a shorter due time.

8. A computer-implemented method, comprising:
   receiving a provisioning request associated with a client, the provisioning request being a request to perform a set of tasks, and each task of the set of tasks corresponding to a cloud application;
   storing each task of the set of tasks in a queue, the queue storing the set of tasks to be processed;

executing a selection protocol that generates an initial weight for each task of the set of tasks, the initial weight for the task being based on a variable characterizing the task at a particular time, and the initial weight indicating a due time for processing the task, and processing of the task being due at the due time;

selecting a first subset of tasks from amongst the set of tasks stored in the queue, each task in the first subset of tasks being selected based on the initial weight assigned to the task;

processing each task in the first subset of tasks during a first processing cycle, the processing causing each task in the first subset of tasks to be completed and removed from the queue;

identifying a task from amongst the set of tasks, the identified task having not been selected for processing in the first subset of tasks;

determining a number of times the task was previously not selected for processing;

updating the initial weight assigned to the task based on the number of times the task was not selected for processing;

selecting a second subset of tasks from amongst one or more tasks remaining in the queue after the selection of the first subset of tasks, the second subset of tasks including the task that was not selected for processing in the first subset of tasks, and the task being selected in the second subset of tasks due to the increased priority associated with the task;

updating the initial weight for each task included in the second subset of tasks, the initial weight being updated based on a change of the variable associated with the task at a later time, and the updated initial weight representing a new due time for processing the task; and processing each task in the second subset of tasks during a second processing cycle.

9. The computer-implemented method of claim 8, wherein, for each task of the set of tasks, the selection protocol is configured to identify any combination of:
an expected completion time for the task;
a number of instances the task was not selected to be included in a subset of tasks for processing;
a number of instances of the set of tasks that have not been processed; and
a number of instances the processing of the task has failed.

10. The computer-implemented method of claim 8, further comprising:
generating a model by executing one or more machine-learning algorithms, the model representing an expected completion time for each task in the set of tasks.

11. The computer-implemented method of claim 8, further comprising:
receiving an override signal that overrides an initial weight assigned to a task of the set of tasks, the override signal causing the initial weight to be replaced with a new weight value.

12. The computer-implemented method of claim 8, wherein the set of tasks are associated with provisioning the cloud application.

13. The computer-implemented method of claim 8, wherein the queue stores an additional set of tasks associated with an additional provisioning request received from another client, and wherein the first subset includes at least one task from the additional set of tasks.

14. The computer-implemented method of claim 8, wherein the set of tasks includes a first task and a second task, wherein the first task is included in the first subset and the second task is included in the second subset, but not the first subset, and wherein the initial weight of the second task is updated to indicate a shorter due time.

15. A system, comprising:
one or more processors; and
a non-transitory computer-readable storage medium containing instructions which, when executed on the one or more processors, cause the one or more processors to perform operations including:
receiving a provisioning request associated with a client, the provisioning request being a request to perform a set of tasks, and each task of the set of tasks corresponding to a cloud application;
storing each task of the set of tasks in a queue, the queue storing the set of tasks to be processed;
executing a selection protocol that generates an initial weight for each task of the set of tasks, the initial weight for the task being based on a variable characterizing the task at a particular time, and the initial weight indicating a due time for processing the task, and processing of the task being due at the due time;
selecting a first subset of tasks from amongst the set of tasks stored in the queue, each task in the first subset of tasks being selected based on the initial weight assigned to the task;
processing each task in the first subset of tasks during a first processing cycle, the processing causing each task in the first subset of tasks to be completed and removed from the queue;
identifying a task from amongst the set of tasks, the identified task having not been selected for processing in the first subset of tasks;
determining a number of times the task was previously not selected for processing;
updating the initial weight assigned to the task based on the number of times the task was not selected for processing;
selecting a second subset of tasks from amongst one or more tasks remaining in the queue after the selection of the first subset of tasks, the second subset of tasks including the task that was not selected for processing in the first subset of tasks, and the task being selected in the second subset of tasks due to the increased priority associated with the task;
updating the initial weight for each task included in the second subset of tasks, the initial weight being updated based on a change of the variable associated with the task at a later time, and the updated initial weight representing a new due time for processing the task; and
processing each task in the second subset of tasks during a second processing cycle.

16. The system of claim 15, wherein, for each task of the set of tasks, the selection protocol is configured to identify any combination of:
an expected completion time for the task;
a number of instances the task was not selected to be included in a subset of tasks for processing;
a number of instances of the set of tasks that have not been processed; and
a number of instances the processing of the task has failed.

17. The system of claim 15, wherein the operations further comprise:

generating a model by executing one or more machine-learning algorithms, the model representing an expected completion time for each task in the set of tasks.

18. The system of claim 15, wherein the operations further comprise:
receiving an override signal that overrides an initial weight assigned to a task of the set of tasks, the override signal causing the initial weight to be replaced with a new weight value.

19. The system of claim 15, wherein the set of tasks are associated with provisioning the cloud application.

20. The system of claim 15, wherein the queue stores an additional set of tasks associated with an additional provisioning request received from another client, and wherein the first subset includes at least one task from the additional set of tasks.

* * * * *

UNITED STATES PATENT AND TRADEMARK OFFICE
CERTIFICATE OF CORRECTION

PATENT NO. : 11,233,873 B2
APPLICATION NO. : 15/840973
DATED : January 25, 2022
INVENTOR(S) : Liu et al.

It is certified that error appears in the above-identified patent and that said Letters Patent is hereby corrected as shown below:

In the Specification

In Column 24, Line 62, delete "$B^{31} \cdot C_3$" and insert -- $B^{31}$. $C_3$ --, therefor.

Signed and Sealed this
Twenty-fourth Day of May, 2022

Katherine Kelly Vidal
*Director of the United States Patent and Trademark Office*